US012347932B2

(12) United States Patent
Seo et al.

(10) Patent No.: US 12,347,932 B2
(45) Date of Patent: Jul. 1, 2025

(54) DUAL POLARIZATION ANTENNA AND ELECTRONIC DEVICE INCLUDING SAME

(71) Applicant: Samsung Electronics Co., Ltd., Gyeonggi-do (KR)

(72) Inventors: Seunghan Seo, Gyeonggi-do (KR); Jaehoon Song, Gyeonggi-do (KR); Yunbum Lee, Gyeonggi-do (KR); Janghoon Han, Gyeonggi-do (KR); Dongil Son, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 186 days.

(21) Appl. No.: 18/093,060

(22) Filed: Jan. 4, 2023

(65) Prior Publication Data

US 2023/0145636 A1 May 11, 2023

Related U.S. Application Data

(63) Continuation of application No. PCT/KR2021/006549, filed on May 26, 2021.

(30) Foreign Application Priority Data

Jul. 7, 2020 (KR) ........................ 10-2020-0083451

(51) Int. Cl.
*H01Q 21/24* (2006.01)
*H01Q 1/24* (2006.01)
*H01Q 9/04* (2006.01)

(52) U.S. Cl.
CPC ............ *H01Q 21/24* (2013.01); *H01Q 1/243* (2013.01); *H01Q 9/045* (2013.01)

(58) Field of Classification Search
None
See application file for complete search history.

(56) References Cited

U.S. PATENT DOCUMENTS 6,320,542 B1 11/2001 Yamamoto et al.
7,834,803 B2 11/2010 Weinstein
(Continued)

FOREIGN PATENT DOCUMENTS

CN 111313153 A 6/2020
JP 06-326508 A 11/1994
(Continued)

OTHER PUBLICATIONS

European Search Report dated Oct. 16, 2023.
Korean Office Action dated Feb. 1, 2025.

*Primary Examiner* — Jany Richardson
(74) *Attorney, Agent, or Firm* — Cha & Reiter, LLC.

(57) ABSTRACT

A disclosed electronic device includes a wireless communication circuit and a plurality of antenna elements. Each of the plurality of antenna elements may include: a first feeder arranged at a first point on a first virtual line, a second feeder arranged at a second point on a second virtual line perpendicular to the first virtual line, and a third feeder arranged at a third point on a third virtual line. The first, second, and third feeders may be connected to the wireless communication unit via first, second, and third electrical paths, respectively. The device may further include a switch arranged on the first electrical path, the second electrical path, and the third electrical path, and configured to electrically connect or disconnect the first feeder, the second feeder, and the third feeder to the wireless communication circuit.

19 Claims, 37 Drawing Sheets

(56) References Cited

U.S. PATENT DOCUMENTS

| | | | |
|---|---|---|---|
| 10,200,881 | B2 | 2/2019 | Schmid et al. |
| 2005/0264457 | A1 | 12/2005 | Shin et al. |
| 2009/0066601 | A1 | 3/2009 | Eom et al. |
| 2010/0260076 | A1 | 10/2010 | Corman et al. |
| 2012/0162035 | A1 | 6/2012 | Jung et al. |
| 2013/0287133 | A1 | 10/2013 | Coon et al. |
| 2017/0222333 | A1 | 8/2017 | Sudo et al. |
| 2019/0020123 | A1 | 1/2019 | Petersson et al. |
| 2019/0196107 | A1 | 6/2019 | Sakr et al. |
| 2019/0386397 | A1 | 12/2019 | Son et al. |
| 2020/0161749 | A1 | 5/2020 | Onaka et al. |
| 2020/0295463 | A1 | 9/2020 | Yamada et al. |
| 2020/0412022 | A1 | 12/2020 | Yun et al. |

FOREIGN PATENT DOCUMENTS

| | | | |
|---|---|---|---|
| JP | 2012-523803 | A | 10/2012 |
| JP | 6705577 | B1 | 5/2020 |
| KR | 10-2005-0114386 | A | 12/2005 |
| KR | 10-2008-0025242 | A | 3/2008 |
| KR | 10-0922001 | B1 | 10/2009 |
| KR | 10-2012-0074588 | A | 7/2012 |
| KR | 10-1181465 | B1 | 9/2012 |
| KR | 10-2019-0098529 | A | 8/2019 |
| KR | 10-2019-0142827 | A | 12/2019 |

DUAL POLARIZATION ANTENNA AND ELECTRONIC DEVICE INCLUDING SAME

CROSS-REFERENCE TO RELATED APPLICATION(S)

This application is a continuation of International Application No. PCT/KR2021/006549, which was filed on May 26, 2021, and claims priority to Korean Patent Application No. 10-2020-0083451, filed on Jul. 7, 2020, in the Korean Intellectual Property Office, the disclosure of which are incorporated by reference herein their entirety.

BACKGROUND

Technical Field

One or more embodiments of the instant disclosure generally relate to an electronic device including a dual polarization antenna.

Description of Related Art

Along with the development of wireless communication technology, electronic devices (e.g., electronic devices for communication) are widely used in everyday life and thus consumption of content by users using such devices has increased exponentially. The rapid increase in the consumption of content may cause network capacity to gradually reach its limit. To meet the demand for wireless data traffic, which has increased since the deployment of 4G communication systems, efforts have been made to develop a new communication system (e.g., 5th generation (5G), pre-5G communication system, or new radio (NR)) for transmitting and/or receiving signals in high frequency (e.g., mmWave) bands (e.g., band of about 1.8 GHz, and about 3 GHz-about 300 GHz).

SUMMARY

The next generation communication technology uses frequencies in a high frequency (e.g., mmWave) band (e.g., band of about 1.8 GHz, and about 3 GHz-about 300 GHz) to transmit and/or receive signals and thus may need a new antenna module structure as well as to have it efficiently arranged to overcome the high free space loss and improving the antenna gain in consideration of characteristics of the frequency band.

An antenna module operating in the high frequency band may include at least one conductive patch capable of easily implementing high gain and dual polarization. According to an embodiment, the antenna module may include multiple conductive patches arranged to be spaced apart at regular intervals on a printed circuit board (e.g., an antenna structure). In case of implementing dual polarization, the conductive patches may be configured to form both vertical polarization and horizontal polarization through a pair of feeders that are disposed at symmetrical positions with respect to an imaginary line passing through the center of the conductive patch so as to simultaneously transmit separate radio signals via two carriers at the same frequency. For example, the feeders may be configured as a first structure in which one feeder may be disposed on a first virtual line parallel to a first side of the printed circuit board and passing through the center of the conductive patch, and the other feeder may be disposed on a second virtual line parallel to a second side of the printed circuit board and passing through the center of the conductive patch. For example, the feeders may be configured as a second structure in which one feeder may be disposed on a third virtual line forming a first angle with the first virtual line passing through the center of the conductive patch, and the other feeder may be disposed on a fourth virtual line perpendicular to the third virtual and passing through the center of the conductive patch.

In the first structure of feeders, the conductive patch (e.g., antenna element) may include a characteristic in which dual polarized equivalent isotropically radiated power (EIRP) characteristic is biased toward one polarized wave. Accordingly, the conductive patch (e.g., antenna element) including the first structure of feeders may have single antenna system (e.g., single input single output (SISO)) performance higher than that of the second structure of feeders.

In the second structure of feeders, the conductive patch (e.g., antenna element) may include a characteristic in which antenna radiation characteristics of each of the double polarization waves are uniform. Accordingly, the conductive patch (e.g., antenna element) including the second structure of feeders may show multi-antenna system (e.g., multiple input multiple output (MIMO)) performance higher than that of the first structure of feeders.

The conductive patch included in the antenna module includes a fixed structure (e.g., the first structure or the second structure) of feeders and thus may be degraded in wireless performance in a specific wireless environment (e.g., multi-antenna system or a single antenna system).

Various embodiments of the disclosure provide a device and a method for adaptively configuring the power feeding structure of antenna elements to be adaptable in a wireless environment in an electronic device.

According to an embodiment, an electronic device may include: a housing; a wireless communication circuit arranged in an internal space of the housing; an antenna module arranged in the internal space and includes a printed circuit board arranged in the internal space and array antenna including multiple antenna elements arranged on the printed circuit board, wherein each one of the multiple antenna elements includes a first feeder arranged at a first point on a first virtual line passing through the center of the one of the multiple antenna elements, and is electrically connected to the wireless communication circuit through a first electrical path, a second feeder arranged at a second point on a second virtual line passing through the center of the one of the multiple antenna elements and perpendicularly crossing the first virtual line, and is electrically connected to the wireless communication circuit through a second electrical path, and a third feeder arranged at a third point on a third virtual line passing through the center of the one of the multiple antenna elements, and is electrically connected to the wireless communication circuit through a third electrical path; and a switch arranged on the first electrical path, the second electrical path, and the third electrical path, and is configured to electrically connect or disconnect the first feeder, the second feeder, and the third feeder to the wireless communication circuit.

According to an embodiments, an electronic device may include: a first housing; a second housing connected to the first housing to be spaced apart from the first housing at a first distance in a first state and spaced apart from the first housing at a second distance different from the first distance in a second state; a wireless communication circuit arranged in an internal space of the first housing; an antenna module arranged in the internal space and includes a printed circuit board arranged in the internal space and array antenna including multiple antenna elements arranged on the printed circuit board, wherein each one of the multiple antenna elements includes a first feeder arranged at a first point on a first virtual line passing through the center of the one of the multiple antenna elements, and is electrically connected to the wireless communication circuit through a first electrical path, a second feeder arranged at a second point on a second virtual line passing through the center of the one of the multiple antenna elements and perpendicularly crossing the first virtual line, and is electrically connected to the wireless communication circuit through a second electrical path, and a third feeder arranged at a third point on a third virtual line passing through the center of the one of the multiple antenna elements, and is electrically connected to the wireless communication circuit through a third electrical path; and a switch arranged on the first electrical path, the second electrical path, and the third electrical path, and configured to electrically connect or disconnect the first feeder, the second feeder, and the third feeder to the wireless communication circuit.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to certain embodiments of the disclosure, the first structure of feeders and the second structure of feeders included in an antenna element of an electronic device may be adaptively selected and, thus, advantages of wireless performance (e.g., beam coverage or multi-antenna throughput) may be obtained according to the selection of the structure of feeders.

Hereinafter, one or more embodiments will be described with reference to the accompanying drawings.

Figure 1:
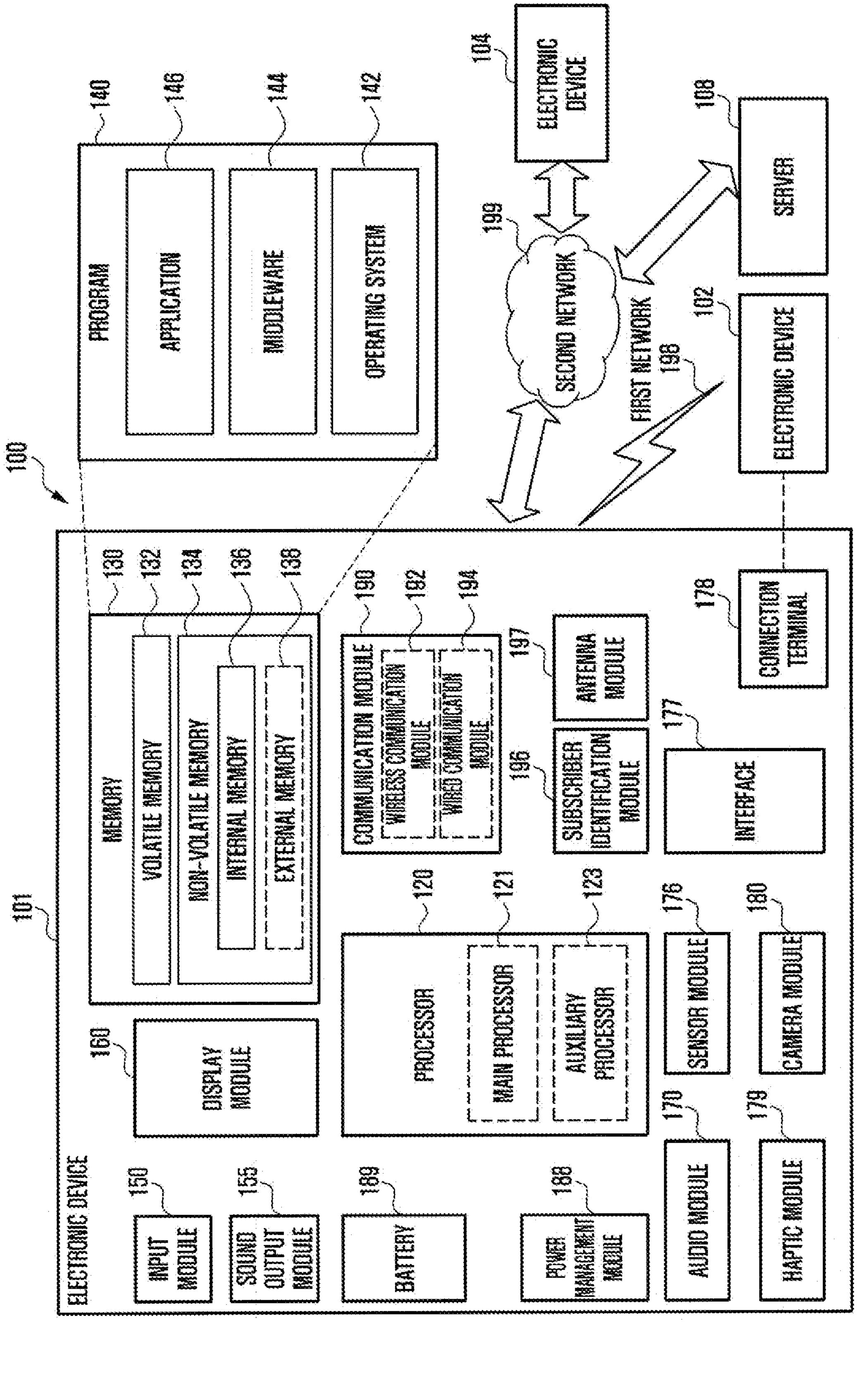
FIG. 1 is a block diagram illustrating an electronic device in a network environment according to an embodiment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device

101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
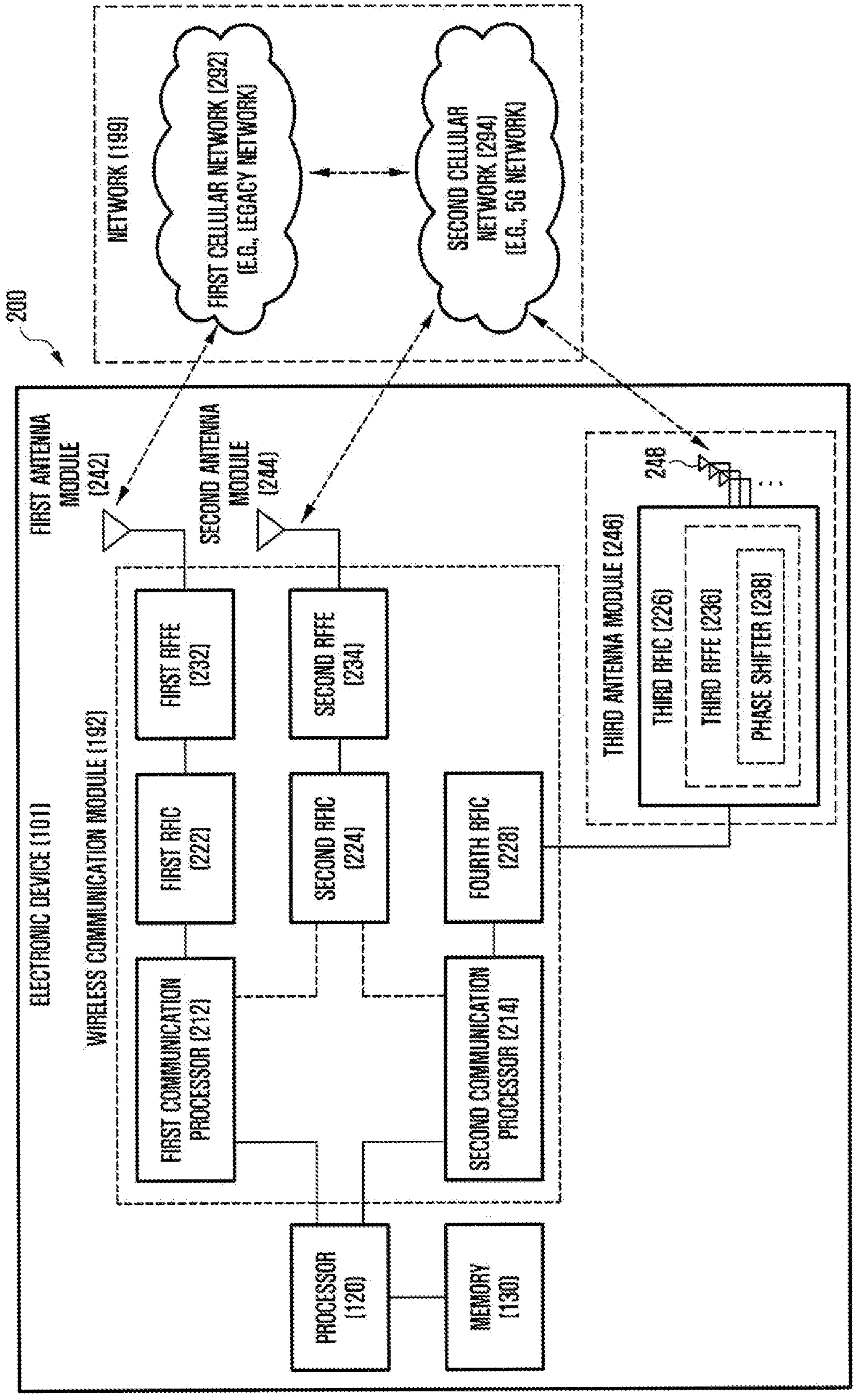
FIG. 2 is a block diagram illustrating an electronic device configured to support legacy network communication and 5G network communication according to an embodiment of the disclosure.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC)

222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3A:
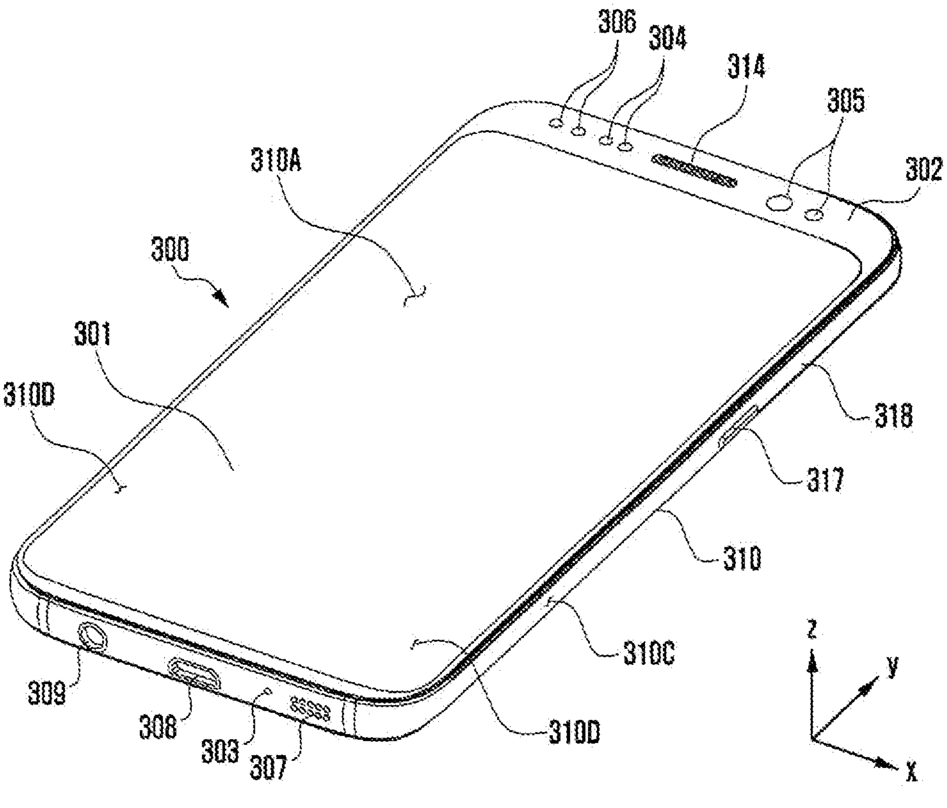
FIG. 3A is a perspective view of an electronic device according to an embodiment of the disclosure.
Figure 3B:
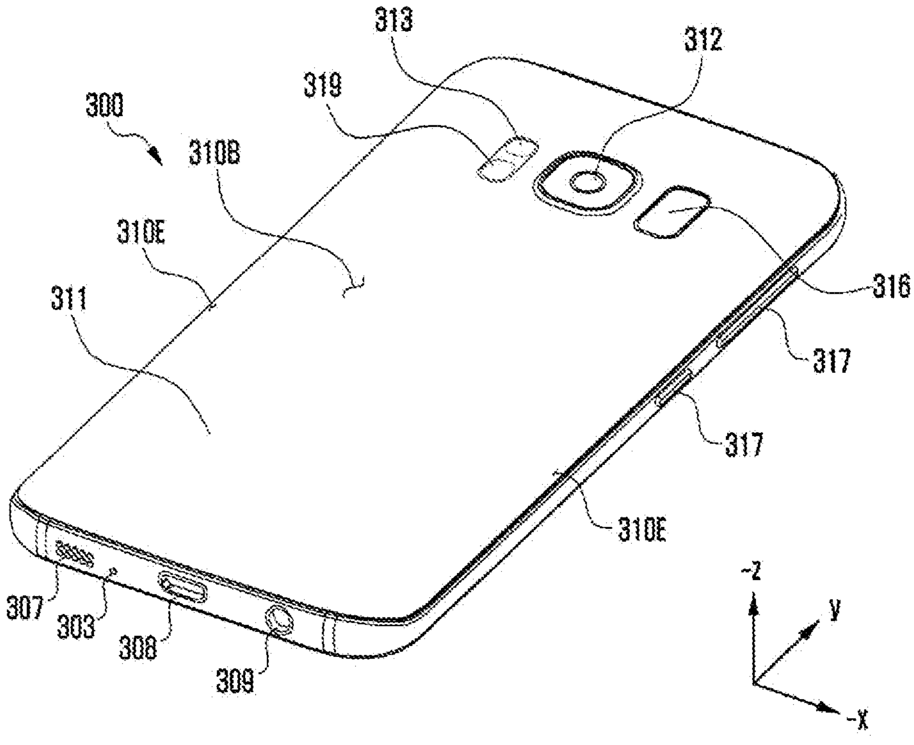
FIG. 3B is a rear perspective view of an electronic device according to an embodiment of the disclosure.

FIG. 3A is a front perspective view of an electronic device 300 according to an embodiment. FIG. 3B is a rear perspective view of an electronic device 300 according to an embodiment.

Referring to FIG. 3A and FIG. 3B, the electronic device 300 (e.g., the electronic device 101 in FIG. 1) according to an embodiment may include a housing 310 including a first surface (or a front surface) 310A, a second surface (or a rear surface) 310B, and a lateral surface 310C surrounding a space (or an internal space) between the first surface 310A and the second surface 310B. According to an embodiment (not shown), the housing may refer to a structure for configuring a portion of the first surface 310A, the second surface 310B, and the lateral surface 310C. According to an embodiment, at least a portion of the first surface 310A may be made of substantially transparent front plate 302 (e.g., a glass plate including various coating layers or polymer plate). The second surface 310B may be formed of a substantially opaque rear plate 311. The rear plate 311 may be made by, for example, coated or colored glass, ceramic, polymers, metals (e.g., aluminum, stainless steel (STS), or magnesium), or a combination of two or more of aforementioned materials. The lateral surface 310C may be coupled to the front plate 302 and the rear plate 311 and formed by a lateral bezel structure (or a "lateral member") 318 including metal and/or polymer. In an embodiment, the rear plate 311 and the lateral bezel structure 318 may be integrated together and include the same material (e.g., metal material such as aluminum).

In the embodiment shown in the drawing, the front plate 302 may include two first areas 310D seamlessly extending from the front surface 310A to be bent toward the rear plate 311 at the opposite ends of a long edge of the front plate 302. In the embodiment described (see FIG. 3B), the rear plate 311 may include two second areas 310E seamlessly extending from the second surface 310B to be bent toward the front plate 302 at the opposite ends of the long edge. In an embodiment, the front plate 302 (or the rear plate 311) may include only one of the first areas 310D (or the second areas 310E). In an embodiment, the front plate 302 (or the rear plate 311) may not include a portion of the first areas 310D (or the second areas 310E). In an embodiment, when viewed from a lateral side of the electronic device 300, the lateral bezel structure 318 may have a first thickness (or width) at a lateral surface in which the first area 310D or the second area 310E is not included, and may have a second thickness thinner than the first thickness at a lateral surface in which the first area 310D or the second area 310E is included.

According to an embodiment, the electronic device 300 may include at least one of a display 301, an audio module 303, 307, or 314, a sensor module 304, 316, or 319, a camera module 305, 312, or 313, a key input device 317, a light emitting element 306, and a connector hole 308 or 309. In some embodiments, the electronic device 300 may omit one of components (e.g., the key input device 317 or the light emitting element 306) or may additionally include another component.

The display 301 may be visually exposed through, for example, a substantial portion of the front plate 302. In some embodiments, at least a portion of the display 301 may be visually exposed through the front plate 302 implementing the first surface 310A and the first area 310D of the lateral surface 310C. In some embodiments, an edge of the display 301 may be formed to be substantially identical to the shape of an outer periphery adjacent to the front plate 302. In another embodiment (not shown), in order to maximize the area through which the display 301 is visually exposed, a gap between the outer periphery of the display 301 and the outer periphery of the front plate 302 may be substantially identical all around the perimeter.

In an embodiment (not shown), the display 301 may include a recess or an opening formed on a portion of a screen display area, and may include at least one of an audio module 314, a sensor module 304, a camera module 305, and a light emitting element 306 which are arranged with the recess or the opening. In an embodiment (not shown), at least one of the audio module 314, the sensor module 304, the camera module 305, a fingerprint sensor 316, and the light emitting element 306 may be included on a rear surface of a screen display area of the display 301. In an embodiment (not shown), the display 301 may be combined to or disposed adjacent to a touch sensing circuit, a pressure sensor for measuring a strength (pressure) of touches, and/or a digitizer for detecting a magnetic field-type stylus pen. In an embodiment, at least a portion of the sensor module 304 and 319 and/or at least a portion of the key input device 317 may be disposed on the first area 310D and/or the second area 310E.

The audio module 303, 307, 314 may include a microphone hole 303 and a speaker hole 307 and 314. A microphone for obtaining a sound from the outside of the device may be disposed in the microphone hole 303 and in another embodiment, multiple microphones may be arranged to detect a direction of a sound. The speaker hole 307, 314 may include an outer speaker hole 307 and a receiver hole 314 used for calling. In an embodiment, the speaker hole 307, 314 and the microphone hole 303 may be implemented into one hole, or a speaker (e.g., piezo speaker) may be included without the speaker hole 307 or 314.

The sensor module 304, 316, or 319 may generate an electrical signal or a data value corresponding to an internal operation state or external environment state of the electronic device 300. The sensor module 304, 316, or 319 may include a first sensor module 304 (e.g., a proximity sensor) disposed on the first surface 310A of the housing 310 and/or a second sensor module (not shown) (e.g., fingerprint sensor), and/or a third sensor module 319 (e.g., heart-rate monitor (HRM) sensor) and/or a fourth sensor module 316 (e.g., fingerprint sensor) disposed on the second surface 310B of the housing 310. The fingerprint sensor may be disposed not only on the first surface 310A (e.g., the display 301) but also on the second surface 310B of the housing 310. The electronic device 300 may further include at least one sensor module not shown in the drawings, for example, a gesture sensor, a gyro sensor, an air pressure sensor, a magnetic sensor, an acceleration sensor, a grip sensor, a color sensor, an infrared (IR) sensor, a biometric sensor, a temperature sensor, humidity sensor, or an illuminance sensor 304.

The camera module 305, 312, or 313 may include the first camera device 305 disposed on the first surface 310A of the electronic device 300 and the second camera device 312 disposed on the second surface 310B, and/or a flash 313. The camera module 305 or 312 may include one or more of lenses, an image sensor, and/or an image signal processor. The flash 313 may include, for example, a light-emitting diode or a xenon lamp. In an embodiment, two or more lenses (an infrared camera, and wide-angle and telephoto lens) and image sensors may be arranged on one surface of the electronic device 300.

The key input device 317 may be disposed on the lateral surface 310C of the housing 310. In an embodiment, the electronic device 300 may not include a portion or entirety of key input device 317, and the excluded key input device 317 may be implemented as various forms, such as a soft key, on the display 301. In some embodiments, the key input device 317 may include a sensor module 316 disposed on the second surface 310B of the housing 310.

The light emitting element 306 may be disposed on the first surface 310A of the housing 310. The light-emitting element 306 may provide state information of the electronic device 300 in a form of light, for example. In another embodiment, the light emitting element 306 may provide, for example, a light source interlinking with an operation of the camera module 305. The light-emitting element 306 may include, for example, a light emitting diode (LED), an infrared LED (IR LED), and a xenon lamp.

The connector hole 308 or 309 may include a first connector hole 308 capable of receiving a connector (e.g., USB connector) for transmitting or receiving power and/or data to or from an external electronic device, and/or a second connector hole (e.g., earphone jack) 309 capable of receiving a connector for transmitting or receiving an audio signal to or from an external electronic device.

Figure 3C:
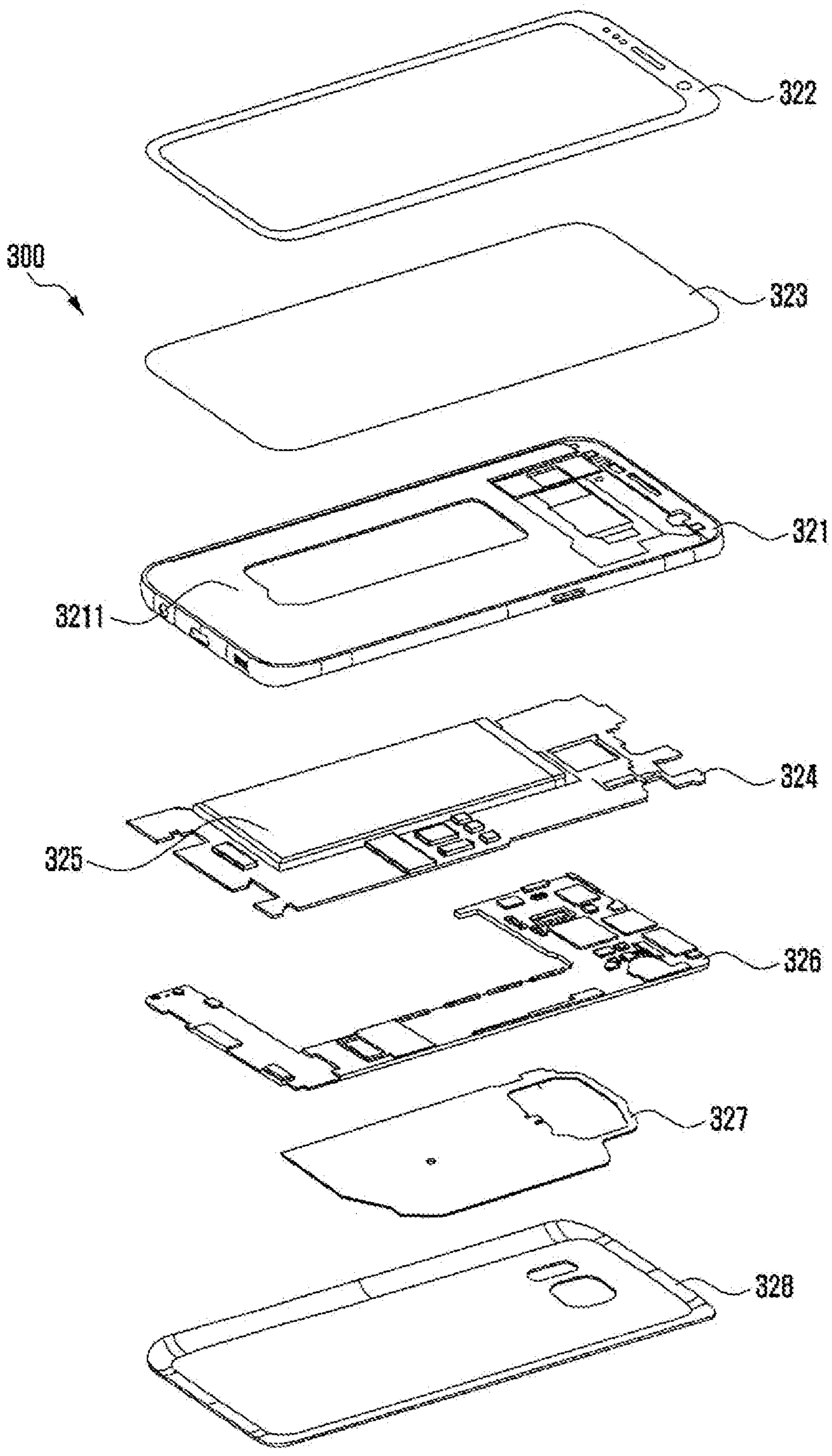
FIG. 3C is an exploded perspective view of an electronic device according to an embodiment of the disclosure.

FIG. 3C is an exploded perspective view of an electronic device 300 according to an embodiment.

Referring to FIG. 3, the electronic device 300 may include a lateral bezel structure 321, a first support member 3211 (e.g., a bracket), a front plate 322, a display 323, a printed circuit board 324, a battery 325, a second support member 326 (e.g., a rear case), an antenna 327, and a rear plate 328. In some embodiment, the electronic device 300 may omit at least one component (e.g., the first support member 3211 or the second support member 326) or may additionally include another component. At least one of the components of the electronic device 300 may be the same as or similar to at least one of the components of the electronic device 300 in FIG. 3A or FIG. 3B, and thus overlapping description thereof will be omitted.

The first support member 3211 may be disposed in the electronic device 300 to be connected to the lateral bezel structure 321 or may be integrated with the lateral bezel structure 321. The first support member 3211 may be made of, for example, metal material and/or non-metal (e.g., polymer) material. The first support member 3211 may have the display 323 coupled to one surface thereof and the printed circuit board 324 coupled to the other surface thereof. A processor, a memory, and/or an interface may be mounted to the printed circuit board 324. The processor may include one or more of, for example, a central processing unit, an application processor, a graphic processing device, an image signal processor, a sensor hub processor, or a communication processor. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory may include, for example, a transitory memory or a non-transitory memory.

The interface may include, for example, a high-definition multimedia interface (HDMI), a universal serial bus (USB) interface, a SD card interface, and/or an audio interface. The interface may electrically or physically connect the electronic device 300 to an external electronic device, and may include, for example, a USB connector, SD card/MMC connector, or an audio connector.

The battery 325 is a device for supplying power to at least one component of the electronic device 300, and may include, for example, a non-rechargeable primary battery, or a rechargeable secondary battery, or a fuel cell. At least a part of the battery 325 may be disposed on the substantially same plane as the printed circuit board 324. The battery 325 may be disposed and integrally formed in the electronic device 300 or may be disposed to be attachable to/detachable from the electronic device 300.

The antenna 327 may be interposed between the rear plate 328 and the battery 325. The antenna 327 may include, for example, a near field communication (NFC) antenna, a wireless charging antenna, and/or a magnetic secure transmission (MST) antenna. The antenna 327 may transmit and receive power required for charging or perform near field communication with an external device, for example. In an embodiment, an antenna structure may be formed by a portion or a combination of the lateral bezel structure 321 and/or the first support member 3211.

Figure 4A:
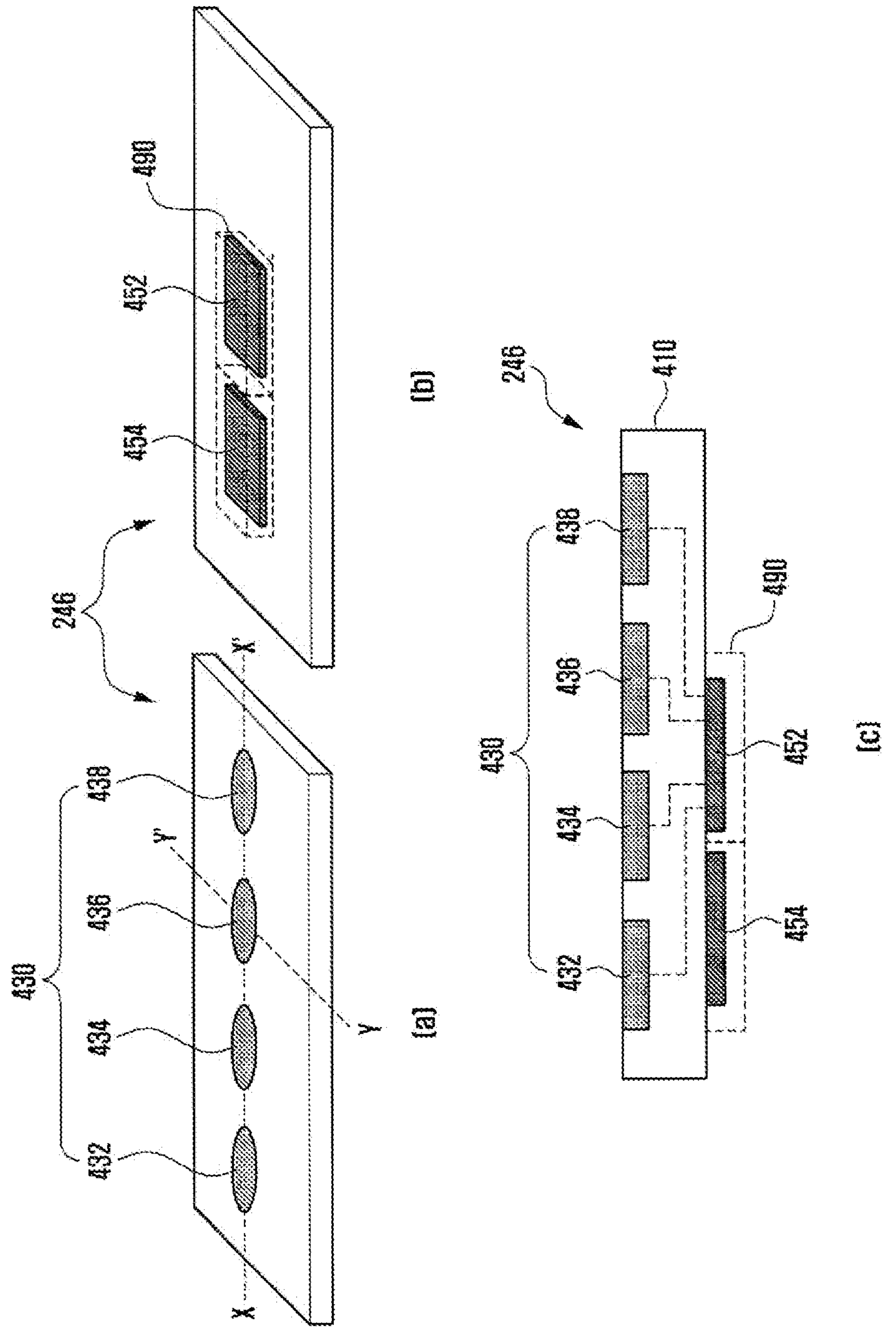
FIG. 4A illustrates an embodiment of a structure of the third antenna module described with reference to FIG. 2.

FIG. 4A illustrates an embodiment of a structure of the third antenna module 246 described with reference to FIG. 2. Part (a) of FIG. 4A is a perspective view viewed from one side of the third antenna module 246 and part (b) of FIG. 4A is a perspective view viewed from another side of the third antenna 246. Part (c) of FIG. 4A is a sectional view of the third antenna module 246 taken along with line X-X'.

Referring to FIG. 4A, in an embodiment, the third antenna module 246 may include a printed circuit board 410, an antenna array 430, a radio frequency integrate circuit (RFIC) 452, and a power manage integrate circuit (PMIC) 454. Optionally, the third antenna module 246 may further include a shielding member 490. In another embodiment, at least one of components included in the third antenna module 246 may be omitted or two or more of the components included in the third antenna module 246 may be integrally formed.

The printed circuit board 410 may include multiple conductive layers and multiple non-conductive layers alternately stacked with the conductive layers. The printed circuit board 410 may provide electrical connection between electronic components arranged on the printed circuit board 410 and/or components disposed outside the printed circuit board 410 by using wires and conductive vias formed on the conductive layer.

The antenna array 430 (e.g., the antenna 248 in FIG. 2) may include multiple antenna elements 432, 434, 436, and 438 arranged to form a directional beam. The antenna elements 432, 434, 436, and 438 may be disposed on a first surface of the printed circuit board 410 as shown in the drawing. According to another embodiment, the antenna array 430 may be disposed inside the printed circuit board 410. According to embodiments, the antenna array 430 may include multiple antenna arrays (e.g., dipole antenna arrays, and/or patch antenna array) of the same or different shapes or types.

The RFIC 452 (e.g., the third RFIC 226 in FIG. 2) may be disposed on another area (e.g., second surface opposite to the first surface) of the printed circuit board 410, which is spaced apart from the antenna array 430. The RFIC 452 may be configured to process signals in a selected frequency band, which is transmitted and/or received through the antenna array 430. According to an embodiment, during transmission, the RFIC 452 may convert a baseband signal obtained from a communication processor (not shown) into an RF signal in a predetermined band. During reception, the RFIC 452 may convert an RF signal received through the antenna array 430 into a baseband signal and transfer the baseband signal to the communication processor.

According to another embodiment, during reception, the RFIC 452 may up-convert an IF signal (e.g., about 9 GHz-about 11 GHz) obtained from an intermediate frequency integrate circuit (IFIC) (e.g., the fourth RFIC 228 in FIG. 2) into an RF signal in a selected band. During reception, the RFIC 452 may down-convert an RF signal received through the antenna array 430 into an IF signal and transfer the IF signal to the IFIC.

The PMIC 454 may be disposed on another partial area (e.g., the second surface) of the printed circuit board 410, which is spaced apart from the antenna array 430. The PMIC 454 may receive voltage or power from a main PCB (not shown) and supply required power for various components (e.g., the RFIC 452) on the antenna module.

The shielding member 490 may be disposed on a portion (e.g., the second surface) of the printed circuit board 410 to electrically shield at least one of the RFIC 452 or the PMIC 454. According to an embodiment, the shielding member 490 may include a shield can.

Although not illustrated, in an embodiment, the third antenna module 246 may be electrically connected to another printed circuit board (e.g., a main circuit board) through a module interface. The module interface may include a connection member, for example, a coaxial cable connector, a board-to-board connector, an interposer, or a flexible printed circuit board (FPCB). The RFIC 452 and/or the PMIC 454 of the antenna module may be electrically connected to the printed circuit board 410 through the connection member.

Figure 4B:
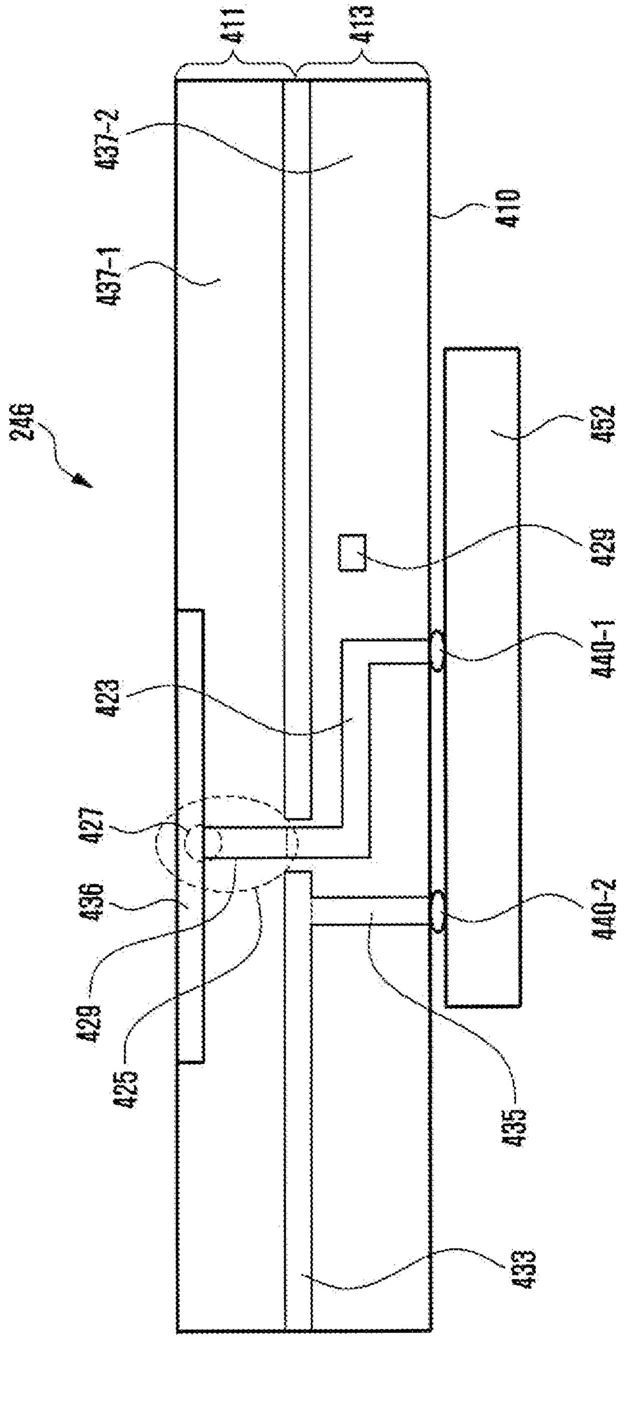
FIG. 4B illustrate a section taken along line Y-Y' of the third antenna module described in part (a) of FIG. 4A.

FIG. 4B illustrate a section taken along line Y-Y' of the third antenna module 246 described in part (a) of FIG. 4A. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a feeder (or feeding point) 425 which are disposed on an outer surface or inside of the dielectric layer. The feeder 425 may include a power feeding point 427 and/or a power feeding line 429.

The network layer 413 may include at least one dielectric layer 437-2, and at least one ground layer 433, at least one conductive via 435, a transmission line 423, and/or a signal line 429 which is formed on the outer surface or inside of the dielectric layer.

Furthermore, in the illustrated embodiment, the RFIC 452 (e.g., the third RFIC 226 in FIG. 2) in part (c) of FIG. 4A may be electrically connected to the network layer 413 through, for example, a first connector (solder bumps) 440-1 and a second connector 440-2. In another embodiment, various connection structures (e.g., solder or BGA) other than the connector may be used. The RFIC 452 may be electrically connected to the antenna element 436 through the first connector 440-1, the transmission line 423, and the power feeding line 425. Furthermore, the RFIC 452 may be electrically connected to the ground layer 433 through the second connector 440-2 and the conductive via 435. Although not illustrated, the RFIC 452 may be electrically connected to the module interface described above through the signal line 429.

Figure 5A:
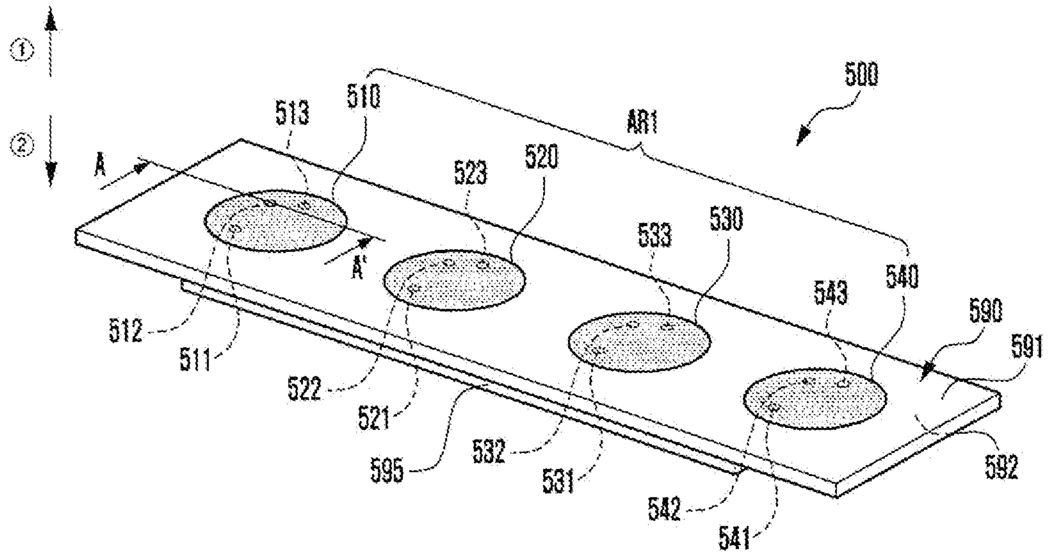
FIG. 5A is a perspective view of an antenna module according to an embodiment of the disclosure.
Figure 5B:
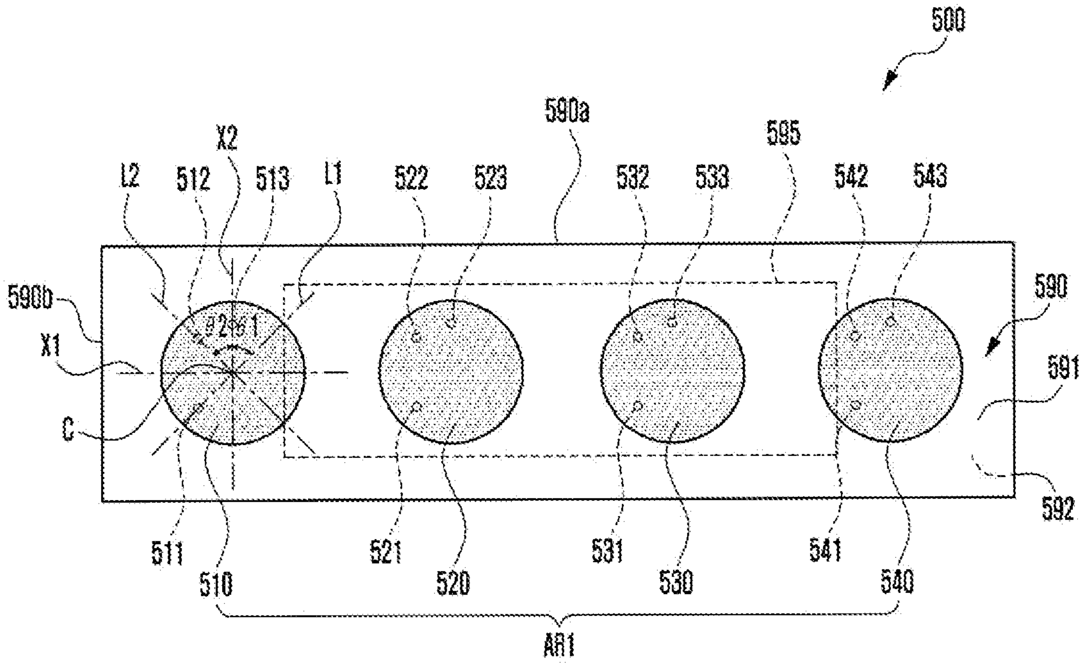
FIG. 5B is a planar view of an antenna module according to an embodiment of the disclosure.

FIG. 5A is a perspective view of an antenna module 500 according to an embodiment of the disclosure. FIG. 5B is a planar view of an antenna module 500 according to an embodiment of the disclosure. According to an embodiment, the antenna structure 500 of FIG. 5A and FIG. 5B may be at least partially similar to the third antenna module 246 in FIG. 2 or may include other features.

Referring to FIG. 5A, the antenna module 500 may include an antenna array AR1 that includes multiple conductive patches 510, 520, 530, and/or 540 (e.g., antenna elements). According to an embodiment, the multiple conductive patches 510, 520, 530, and/or 540 (e.g., antenna elements) may be disposed on the printed circuit board 590. According to an embodiment, the printed circuit board 590 may include a first surface 591 facing a first direction (direction ①) and a second surface 592 facing a direction (direction ②) opposite to the first surface 591. According to an embodiment, the antenna module 500 may include a wireless communication circuit 595 (e.g., the RFIC 452 in FIG. 4A) disposed on the second surface 592 of the printed circuit board 590. According to an embodiment, the multiple conductive patches 510, 520, 530, 540 may be electrically connected to the wireless communication circuit 595. According to an embodiment, the wireless communication circuit 595 may be configured to transmit and/or receive in a radio frequency band in about 1.8 GHz and/or a range of about 3 GHz to about 100 GHz through the antenna array AR1.

According to an embodiment, the multiple conductive patches 510, 520, 530, and/or 540 may include a first conductive patch 510, a second conductive patch 520, a third conductive patch 530, and/or a fourth conductive patch 540 which are disposed at predetermined intervals on an area adjacent to the first surface 591 inside the printed circuit board 590 or on the first surface 591 of the printed circuit board 590. The conductive patches 510, 520, 530, and/or 540 may have substantially the same configuration. The antenna module 500 according to an exemplary embodiment of the disclosure is illustrated and described to have the antenna array AR1 including four conductive patches 510, 520, 530, and/or 540, but is not limited thereto. For example, the antenna module 500 may include two or more conductive patches (or antenna elements) as the antenna array AR1.

According to an embodiment, the antenna module 500 may operate as a dual polarized antenna through feeders (or feeding points) arranged on each of the multiple conductive patches 510, 520, 530, and/or 540. According to an embodiment, the conductive patches 510, 520, 530, and/or 540 may have a shape that is vertically and horizontally symmetrical to form a dual polarized antenna. For example, the conductive patches 510, 520, 530, and/or 540 may be formed in square, circular, or regular octagonal shape. According to an embodiment, the first conductive patch 510 may include a first feeder (or feeding point) 511, a second feeder 512, and a third feeder 513. According to an embodiment, the second conductive patch 520 may include a fourth feeder 521, a fifth feeder 522, and a sixth feeder 523. According to an embodiment, the third conductive patch 530 may include a seventh feeder 531, an eighth feeder 532, and a ninth feeder 533. According to an embodiment, the fourth conductive patch 540 may include a tenth feeder 541, an 11th feeder 542, and a 12th feeder 543.

According to an embodiment, the wireless communication circuit 595 may be configured to transmit and/or receive a first signal through a first polarized antenna array AR1 including the first feeder 511, the fourth feeder 521, the seventh feeder 531, and/or the tenth feeder 541. According to an embodiment, the wireless communication circuit 595 may be configured to transmit and/or receive a second signal through a second polarized antenna array AR2 including the second feeder 512, the fifth feeder 522, the eighth feeder 532, and/or the 11th feeder 542. For example, the wireless communication circuit 595 may transmit and/or receive the first signal and the second signal, which may be the same or different signals, in the same frequency band. According to an embodiment, the wireless communication circuit 595 may be configured to transmit and/or receive a third signal through the first polarized antenna array or the second polarized antenna array including the third feeder 513, the sixth feeder 523, the ninth feeder 533, and/or the 12th feeder 543.

Although, in explaining FIG. 5B, the arrangement structure of the first feeder 511, the second feeder 512, and the third feeder 513 which are arranged on the first conductive patch 510 is illustrated and described, feeders 521, 522, 523, 531, 532, 533, 541, 542, and/or 543 of other conductive patches 520, 530, and/or 540 may have substantially the same arrangement structure.

Referring to FIG. 5B, the antenna module 500 may include the printed circuit board 590 and an antenna structure including conductive patches 510, 520, 530, and/or 540 arranged on the first surface 591 of the printed circuit board 590. According to an embodiment, the printed circuit board 590 may be formed in a rectangular shape to accommodate the multiple conductive patches 510, 520, 530, 540 arranged at predetermined intervals. Accordingly, the printed circuit board 590 may have a first side 590*a* and a second side 590*b* having a length shorter than that of the first side 590*a*.

According to an embodiment, the first conductive patch 510 may include the first feeder 511 to transmit and/or receive a first signal and the second feeder 512 to transmit and/or receive a second signal. According to an embodiment, the first feeder 511 and the second feeder 512 may be arranged so that substantially different polarization characteristics are developed in the same operating frequency band. According to an embodiment, the first feeder 511 and the second feeder 512 may be arranged so that substantially the same radiation performance is developed in the same frequency band. According to an embodiment, the first conductive patch 510 may include a virtual first axis X1 passing the center C of the first conductive patch 510 and substantially parallel with the first side 590*a* of the printed circuit board 590 and a virtual second axis X2 passing the center C of the first conductive patch 510 and substantially parallel with the second side 590*b* of the printed circuit board 590. According to an embodiment, the first feeder 511 and the second feeder 512 may be configured in a first power feeding structure (e.g., an "X" shaped power feeding polarization structure). For example, the first feeder 511 may be arranged at a first point on a first virtual line L1 passing the center C of the first conductive patch 510 and having a slope inclined at a first angle $\theta_1$ (e.g., about 45°) with respect to the virtual second axis X2. For example, the second feeder 512 may be arranged at a second point on a second virtual line L2 passing the center C of the first conductive patch 510 and having a slope inclined at a second angle $\theta_2$ (e.g., about −45°) with respect to the virtual second axis X2. The sum of the first angle $\theta_1$ and the second angle 02 may be substantially perpendicular (about 90°). According to an embodiment, the first feeder 511 and the second feeder 512, which are arranged on the first virtual line L1 and the second virtual line L2, respectively, are affected by a ground (e.g., the ground 433 in FIG. 4B) disposed on the rectangular printed circuit board 590 and having the same size (e.g., area) and thus may implement substantially the same radiation performance.

According to an embodiment, the first conductive patch 510 may include the third feeder 513 to transmit and/or receive a third signal. According to an embodiment, the third feeder 513 may be configured in a second power feeding structure (e.g., an "+" shaped power feeding polarization structure). For example, the third feeder 513 may be disposed at a third point on the virtual second axis X2 passing the center C of the first conductive patch 510. According to an embodiment, the first feeder 511 and the second feeder 512 may be arranged on a first area (e.g., left area) with reference to the virtual second axis X2 passing the center C of the first conductive patch 510. According to an embodiment, the third feeder 513 may be arranged on a third area (e.g., upper area) with reference to the virtual first axis X1 passing the center C of the first conductive patch 510.

FIG. 6A, FIG. 6B, FIG. 6C, FIG. 6D, and FIG. 6E illustrate embodiments of an antenna module 610, 620, 630, 640, and/or 650 having various feeder arrangement configurations according to certain embodiments of the disclosure. According to certain embodiments, the antenna module 610, 620, 630, 640, and/or 650 in FIG. 6A to FIG. 6E may be at least partially similar to the third antenna module 246 in FIG. 2 or may include other embodiments of an antenna module.

According to certain embodiments of the disclosure, at least one of conductive patches may include at least one feeder having the first structure and at least one feeder having the second structure. According to an embodiment, the at least one feeder of the first structure may include feeders arranged at different locations on the first virtual line L1 (e.g., the first virtual line L1 in FIG. 5B) and the second virtual line L2 (e.g., the second virtual line L2 in FIG. 5B). For example, the feeder of the first structure may include a feeder of "X" shaped power feeding polarization structure. According to an embodiment, at least one feeder of the second structure may include a feeder arranged on the virtual second axis X2 (e.g., the virtual second axis X2 in FIG. 5B) (or the virtual first axis X1 (e.g., the virtual first axis X1 in FIG. 5B)). For example, the feeder of the second structure may include a feeder of "+" shaped power feeding polarization structure. According to an embodiment, in case that imaginary lines are formed by extending to each feeder (e.g., first feeder 6111 and third feeder 6114) from the center C of a conductive patch (e.g., the first conductive patch 611), the feeder of the first structure and the feeder of the second structure may have a predetermined angle (e.g., about 45° or 135°) therebetween with respect to the respective axes (e.g., the first virtual line L1 and the first axis X1, or the second virtual line L2 and the second axis X2).

Figure 6A:
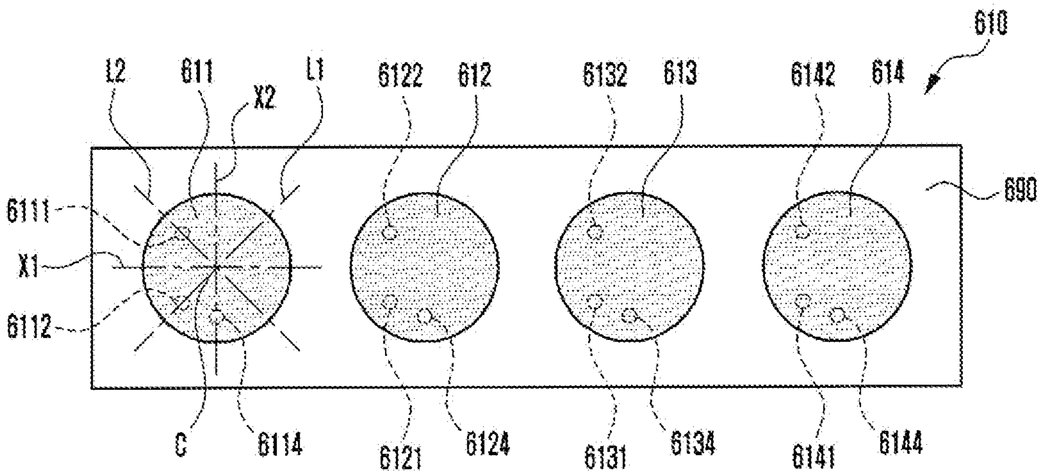
FIG. 6A, FIG. 6B, FIG. 6C, FIG. 6D, and FIG. 6E illustrate embodiments of an antenna module having various feeder arrangement configurations according to certain embodiments of the disclosure.

Referring to FIG. 6A, the antenna module 610 may include a printed circuit board 690 (e.g., the printed circuit board 590 in FIG. 5B) and conductive patches 611, 612, 613, 614 arranged on the printed circuit board 690. According to an embodiment, the conductive patches 611, 612, 613, 614 may be arranged at predetermined intervals and include a first conductive patch 611 including a first feeder 6111, a second feeder 6112, and/or a third feeder 6114, a second conductive patch 612 including a fourth feeder 6121, a fifth feeder 6122, and/or a sixth feeder 6124, a third conductive patch 613 including a seventh feeder 6131, an eighth feeder 6132, and/or a ninth feeder 6134, and/or a fourth conductive patch 614 including a tenth feeder 6141, an 11th feeder 6142, and/or a 12th feeder 6144.

According to an embodiment, the first conductive patch 611 may include the first feeder 6111 and the second feeder 6112 which are respectively arranged on the first virtual line L1 and the second virtual line L2, and the third feeder 6114 arranged on the virtual second axis X2. According to an embodiment, both the first feeder 6111 and the second feeder 6112 may be arranged on a first area (e.g., left area) with reference to the virtual second axis X2 (e.g., the virtual second axis X2 in FIG. 5B) passing the center C of the first conductive patch 611. According to an embodiment, the third feeder 6114 may be arranged on a fourth area (e.g., lower area) with reference to the virtual first axis X1 (e.g., the virtual first axis X1 in FIG. 5B) passing the center C of the first conductive patch 611. According to an embodiment, the remaining patches 612, 613, 614 may include feeders 6121, 6122, 6124, 6131, 6132, 6134, 6141, 6142, and/or 6144 arranged in substantially the same manner, as well.

Figure 6B:
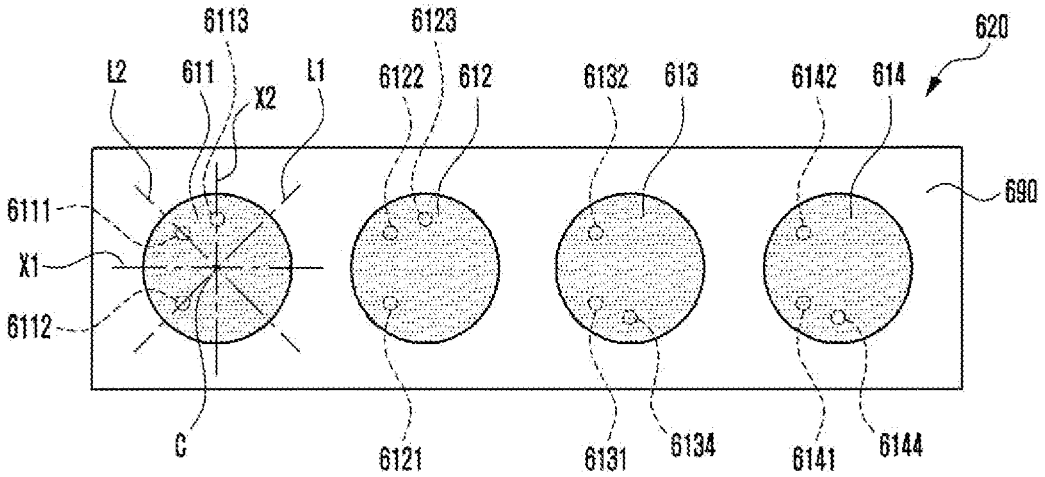

Referring to FIG. 6B, the antenna module 620 may include the conductive patches 611, 612, 613, and/or 614 of which the feeders 6111, 6112, 6121, 6122, 6131, 6132, 6141, and/or 6142 of the first structure are arranged on the first area (e.g., the left area) with reference to the virtual second axis X2. According to an embodiment, the antenna module 620 may include the first conductive patch 611 and/or the second conductive patch 612 of which the feeder 6113 and/or 6123 of the second structure is arranged on the third area (e.g., the upper area) with reference to the virtual first axis X1. According to an embodiment, the antenna module 620 may include the third conductive patch 613 and/or the fourth conductive patch 614 of which the feeder 6134 and/or 6144 of the second structure is arranged on the fourth area (e.g., the lower area) opposite to the third area (e.g., the upper area) with reference to the virtual first axis X1.

Figure 6C:
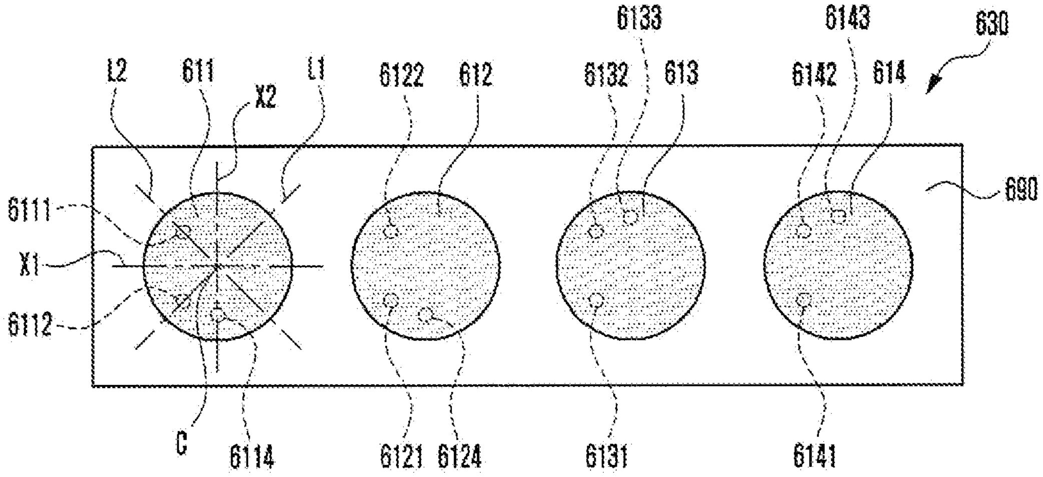

Referring to FIG. 6C, the antenna module 630 may include the conductive patches 611, 612, 613, and/or 614 of which the feeders 6111, 6112, 6121, 6122, 6131, 6132, 6141, and/or 6142 of the first structure are arranged on the first area (e.g., the left area) with reference to the virtual second axis X2. According to an embodiment, the antenna module 650 may include the first conductive patch 611 and/or the second conductive patch 612 of which the feeder 6114, 6124 of the second structure is arranged on the fourth area (e.g., the lower area) with reference to the virtual first axis X1. According to an embodiment, the antenna module 630 may include the third conductive patch 613 and/or the fourth conductive patch 614 of which the feeder 6133 and/or 6143 of the second structure is arranged on the third area (e.g., the upper area) opposite to the fourth area (e.g., the lower area) with reference to the virtual first axis X1.

Figure 6D:
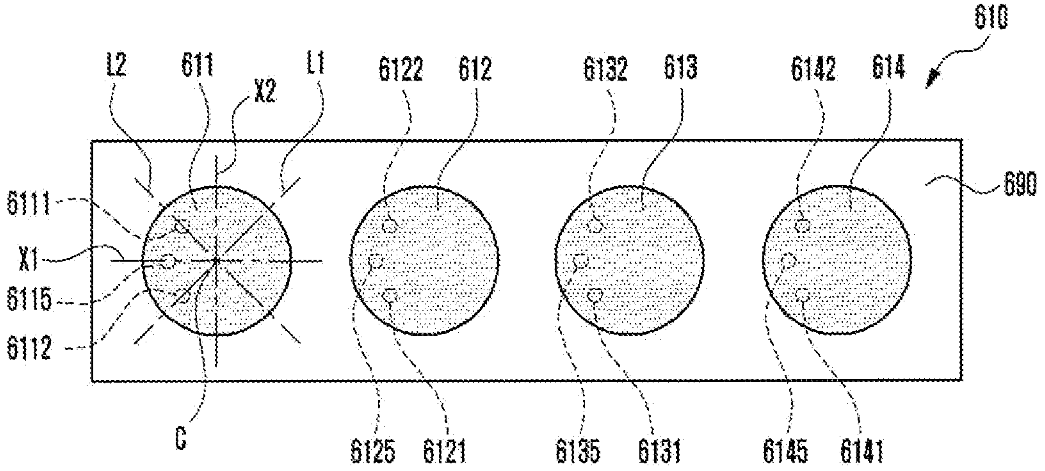

Referring to FIG. 6D, the antenna module 640 may include the conductive patches 611, 612, 613, and/or 614 of which the feeders 6111, 6112, 6121, 6122, 6131, 6132, 6141, and/or 6142 of the first structure are arranged on the first area (e.g., the left area) with reference to the virtual second axis X2. According to an embodiment, the antenna module 640 may include the conductive patches 611, 612, 613, and/or 614 of which the feeders 6115, 6125, 6135, and/or 6145 of the second structure are arranged on the first area (e.g., the left area) with reference to the virtual second axis X2.

Figure 6E:
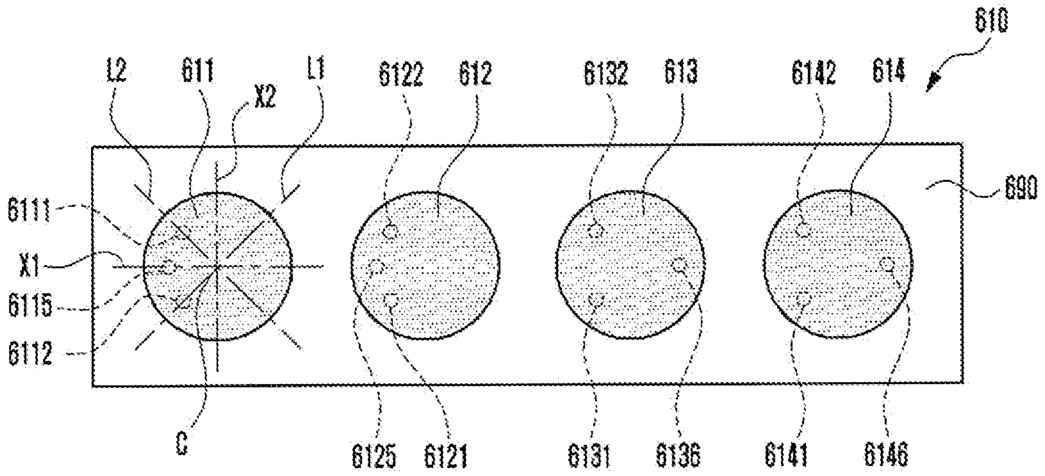

Referring to FIG. 6E, the antenna module 650 may include the conductive patches 611, 612, 613, and/or 614 of which the feeders 6111, 6112, 6121, 6122, 6131, 6132, 6141, and/or 6142 of the first structure are arranged on the first area (e.g., the left area) with reference to the virtual second axis X2. According to an embodiment, the antenna module 650 may include the first conductive patch 611 and/or the second conductive patch 612 of which the feeder 6115 and/or 6125 of the second structure is arranged on the first area (e.g., the left area) with reference to the virtual second axis X2. According to an embodiment, the antenna module 650 may include the third conductive patch 613 and/or the fourth conductive patch 614 of which the feeder 6136 and/or 6146 of the second structure is arranged on the second area (e.g., the right area) opposite to the first area (e.g., the left area) with reference to the virtual second axis X2.

FIG. 7A, FIG. 7B, FIG. 7C, and FIG. 7D illustrate additional embodiments of an antenna module 710, 720, 730, and/or 740 having various feeder arrangement configurations according to certain embodiments of the disclosure. According to certain embodiments, the antenna module 710, 720, 730, and/or 740 in FIG. 7A to FIG. 7D may be at least partially similar to the third antenna module 246 in FIG. 2 or may include other embodiments of an antenna module.

According to certain embodiments of the disclosure, at least one of conductive patches may include at least one feeder having the first structure (e.g., "X" shaped power feeding polarization structure) and at least one feeder having the second structure (e.g., "+" shaped power feeding polarization structure). According to an embodiment, the at least one feeder of the first structure may include feeders arranged at different locations on the first virtual line L1 (e.g., the first virtual line L1 in FIG. 5B) and the second virtual line L2 (e.g., the second virtual line L2 in FIG. 5B). According to an embodiment, at least one feeder of the second structure may include a feeder arranged on the virtual second axis X2 (e.g., the virtual second axis X2 in FIG. 5B) or the virtual first axis X1 (e.g., the virtual first axis X1 in FIG. 5B).

Figure 7A:
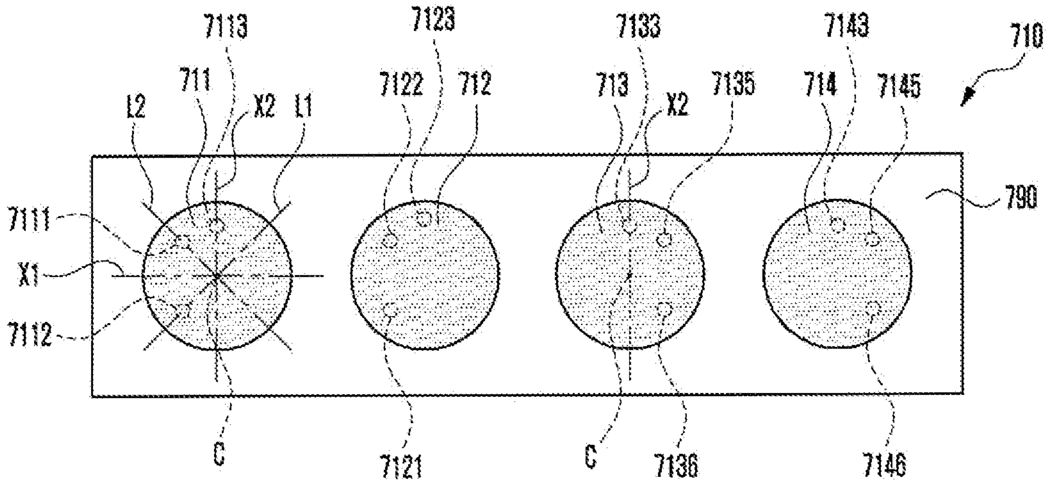
FIG. 7A, FIG. 7B, FIG. 7C, and FIG. 7D illustrate additional embodiment of an antenna module having various feeder arrangement configurations according to certain embodiments of the disclosure.

Referring to FIG. 7A, the antenna module 710 may include a printed circuit board 790 (e.g., the printed circuit board 590 in FIG. 5B) and conductive patches 711, 712, 713, and/or 714 disposed on the printed circuit board 790. According to an embodiment, the conductive patches 711, 712, 713, and/or 714 may be arranged at predetermined intervals and include a first conductive patch 711 including a first feeder 7111, a second feeder 7112, and a third feeder 7113, a second conductive patch 712 including a fourth feeder 7121, a fifth feeder 7122, and a sixth feeder 7123, a third conductive patch 713 including a seventh feeder 7135, an eighth feeder 7136, and a ninth feeder 7133, and/or a fourth conductive patch 714 including a tenth feeder 7145, an 11th feeder 7146, and a 12th feeder 7143.

According to certain embodiments, the antenna module 710 may include the first conductive patch 711 and the second conductive patch 712 of which the feeders 7111, 7112, 7121, and/or 7122 of the first structure are arranged on the first area (e.g., the left area) with reference to the virtual second axis X2. According to an embodiment, the antenna module 710 may include the third conductive patch 713 and the fourth conductive patch 714 of which the feeders 7135, 7136, 7145, and/or 7146 of the first structure are arranged on the second area (e.g., the right area) opposite to the first area (e.g., the left area) with reference to the virtual second axis X2. According to an embodiment, the antenna module 710 may include the conductive patches 711, 712, 713, and 714 of which the feeder 7113, 7123, 7133, or 7143 of the second structure is arranged on the third area (e.g., the upper area) with reference to the virtual first axis X1.

Figure 7B:
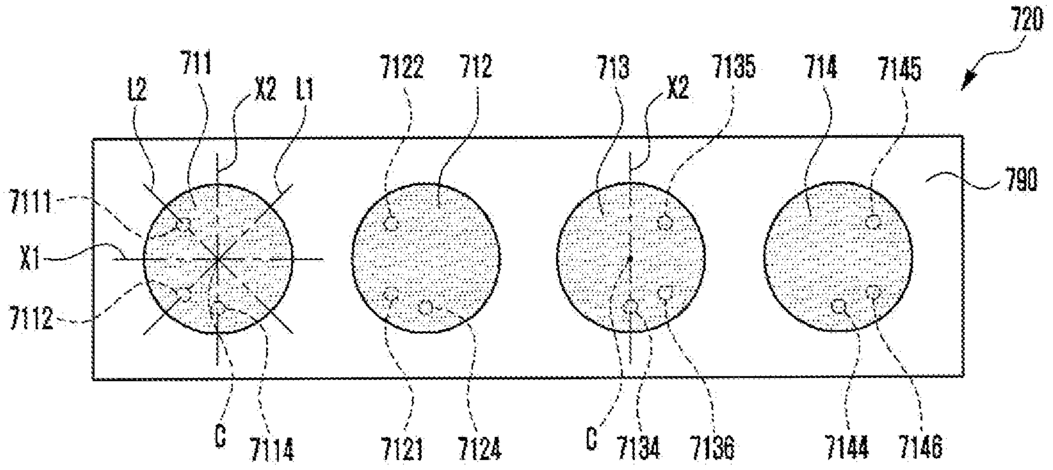

Referring to FIG. 7B, the antenna module 720 may include the first conductive patch 711 and the second conductive patch 712 of which the feeders 7111, 7112, 7121, and/or 7122 of the first structure are arranged on the first area (e.g., the left area) with reference to the virtual second axis X2. According to an embodiment, the antenna module 720 may include the third conductive patch 713 and the fourth conductive patch 714 of which the feeders 7135, 7136, 7145, and/or 7146 of the first structure are arranged on the second area (e.g., the right area) opposite to the first area (e.g., the left area) with reference to the virtual second axis X2. According to an embodiment, the antenna module 720 may include the conductive patches 711, 712, 713, and 714 of which the feeder 7114, 7124, 7134, or 7144 of the second structure is arranged on the fourth area (e.g., the lower area) with reference to the virtual first axis X1.

Figure 7C:
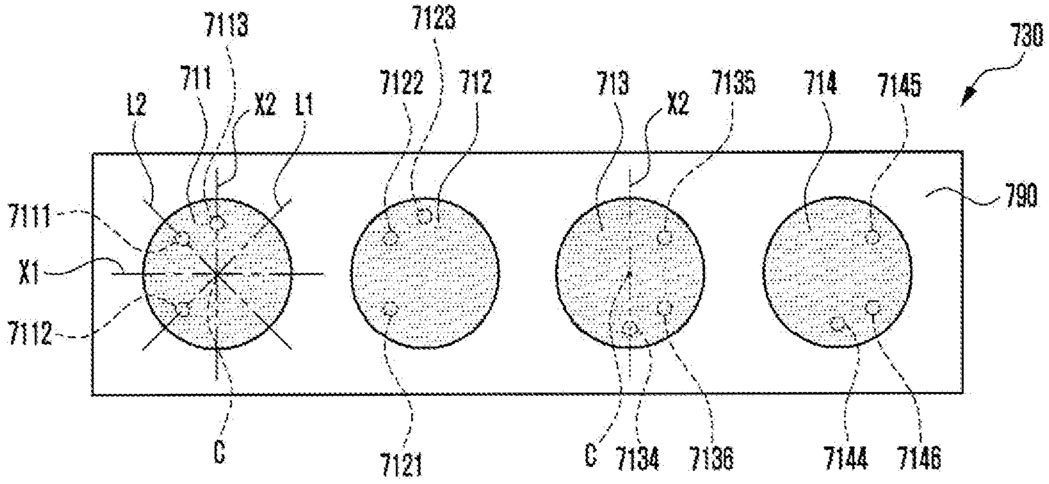

Referring to FIG. 7C, the antenna module 730 may include the first conductive patch 711 and the second conductive patch 712 of which the feeders 7111, 7112, 7121, and/or 7122 of the first structure are arranged on the first area (e.g., the left area) with reference to the virtual second axis X2. According to an embodiment, the antenna module 730 may include the third conductive patch 713 and the fourth conductive patch 714 of which the feeders 7135, 7136, 7145, and/or 7146 of the first structure are arranged on the second area (e.g., the right area) opposite to the first area (e.g., the left area) with reference to the virtual second axis X2. According to an embodiment, the antenna module 730 may include the first conductive patch 711 and the second conductive patch 712 of which the feeder 7113 or 7123 of the second structure is arranged on the third area (e.g., the upper area) with reference to the virtual first axis X1. According to an embodiment, the antenna module 730 may include the third conductive patch 713 and the fourth conductive patch 714 of which the feeder 7134 or 7144 of the second structure is arranged on the fourth area (e.g., the lower area) opposite to the third area (e.g., the upper area) with reference to the virtual first axis X1.

Figure 7D:
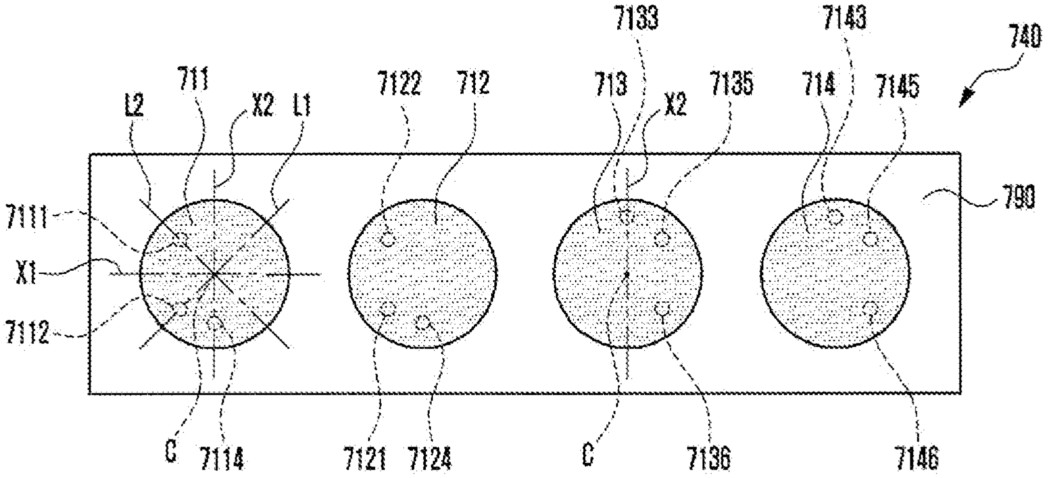

Referring to FIG. 7D, the antenna module 740 may include the first conductive patch 711 and the second conductive patch 712 of which the feeders 7111, 7112, 7121, and/or 7122 of the first structure are arranged on the first area (e.g., the left area) with reference to the virtual second axis X2. According to an embodiment, the antenna module 740 may include the third conductive patch 713 and the fourth conductive patch 714 of which the feeders 7135, 7136, 7145, and/or 7146 of the first structure are arranged on the second area (e.g., the right area) opposite to the first area (e.g., the left area) with reference to the virtual second axis X2. According to an embodiment, the antenna module 740 may include the first conductive patch 711 and the second conductive patch 712 of which the feeder 7114 or 7124 of the second structure is arranged on the fourth area (e.g., the lower area) with reference to the virtual first axis X1. According to an embodiment, the antenna module 740 may include the third conductive patch 713 and the fourth conductive patch 714 of which the feeder 7133 or 7143 of the second structure is arranged on the third area (e.g., the upper area) with reference to the virtual first axis X1.

FIG. 8A, FIG. 8B, FIG. 8C, and FIG. 8D illustrate still other additional embodiments of an antenna module 810, 820, 830, and 840 having various feeder arrangement configurations according to certain embodiments of the disclosure. According to certain embodiments, the antenna module 810, 820, 830, and 840 in FIG. 8A to FIG. 8D may be at least partially similar to the third antenna module 246 in FIG. 2 or may include other embodiments of an antenna module.

According to certain embodiments of the disclosure, at least one of conductive patches may include at least one feeder having the first structure (e.g., "X" shaped power feeding polarization structure) and at least one feeder having the second structure (e.g., "+" shaped power feeding polarization structure). According to an embodiment, the at least one feeder of the first structure may include feeders arranged at different locations on the first virtual line L1 (e.g., the first virtual line L1 in FIG. 5B) and the second virtual line L2 (e.g., the second virtual line L2 in FIG. 5B). According to an embodiment, at least one feeder of the second structure may include a feeder arranged on the virtual second axis X2 (e.g., the virtual second axis X2 in FIG. 5B) (or the virtual first axis X1 (e.g., the virtual first axis X1 in FIG. 5B)).

Figure 8A:
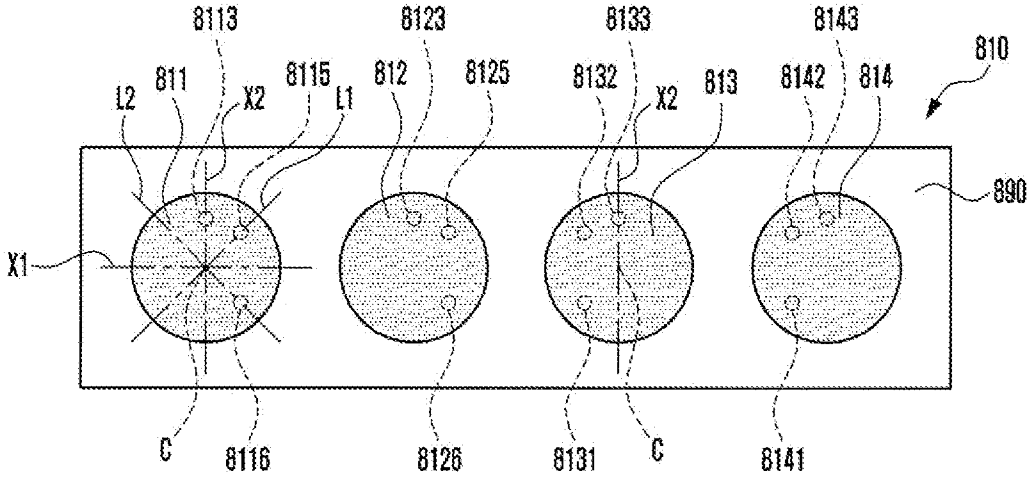
FIG. 8A, FIG. 8B, FIG. 8C, and FIG. 8D illustrate still more additional embodiment of an antenna module having various feeder arrangement configurations according to certain embodiments of the disclosure.

Referring to FIG. 8A, the antenna module 810 may include a printed circuit board 890 (e.g., the printed circuit board 590 in FIG. 5B) and conductive patches 811, 812, 813, and/or 814 disposed on the printed circuit board 890. According to an embodiment, the conductive patches 811, 812, 813, and/or 814 may be arranged at predetermined intervals and include a first conductive patch 811 including a first feeder 8115, a second feeder 8116, and a third feeder 8113, a second conductive patch 812 including a fourth feeder 8125, a fifth feeder 8126, and a sixth feeder 8123, a third conductive patch 813 including a seventh feeder 8131, an eighth feeder 8132, and a ninth feeder 8133, and/or a fourth conductive patch 814 including a tenth feeder 8141, an 11th feeder 8141, and a 12th feeder 8143.

According to an embodiment, the antenna module 810 may include the first conductive patch 811 and the second conductive patch 812 of which the feeders 8115, 8116, 8125, and/or 8126 of the first structure are arranged on the second area (e.g., the right area) with reference to the virtual second axis X2. According to an embodiment, the antenna module 810 may include the third conductive patch 813 and the fourth conductive patch 814 of which the feeders 8131, 8132, 8141, and/or 8142 of the first structure are arranged on the first area (e.g., the left area) opposite to the second area (e.g., the right area) with reference to the virtual second axis X2. According to an embodiment, the antenna module 810 may include the conductive patches 811, 812, 813, and 814 of which the feeder 8113, 8123, 8133, or 8143 of the second structure is arranged on the third area (e.g., the upper area) with reference to the virtual first axis X1.

Figure 8B:
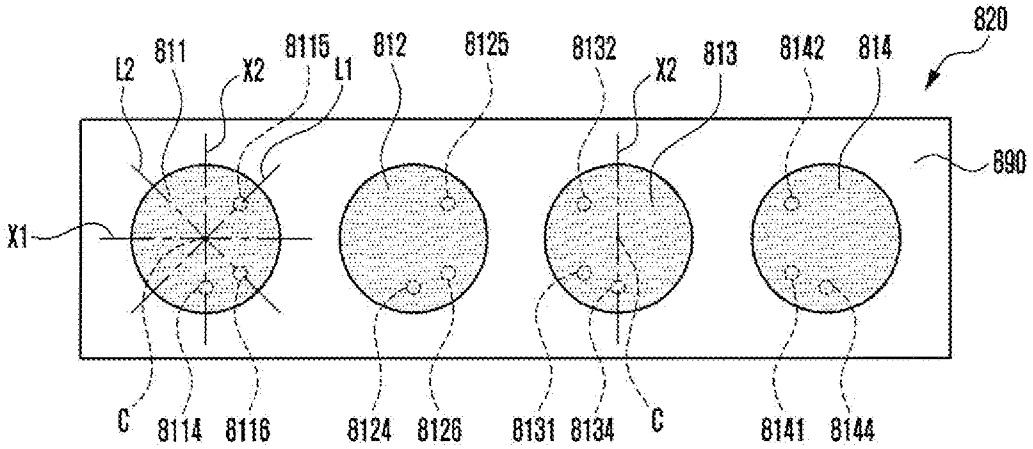

Referring to FIG. 8B, the antenna module 820 may include the first conductive patch 811 and the second conductive patch 812 of which the feeders 8115, 8116, 8125, and/or 8126 of the first structure are arranged on the second area (e.g., the right area) with reference to the virtual second axis X2. According to an embodiment, the antenna module 810 may include the third conductive patch 813 and the fourth conductive patch 814 of which the feeders 8131, 8132, 8141, and/or 8142 of the first structure are arranged on the first area (e.g., the left area) with reference to the virtual second axis X2. According to an embodiment, the antenna module 820 may include the conductive patches 811, 812, 813, and 814 of which the feeder 8114, 8124, 8134, or 8144 of the second structure is arranged on the fourth area (e.g., the lower area) with reference to the virtual first axis X1.

Figure 8C:
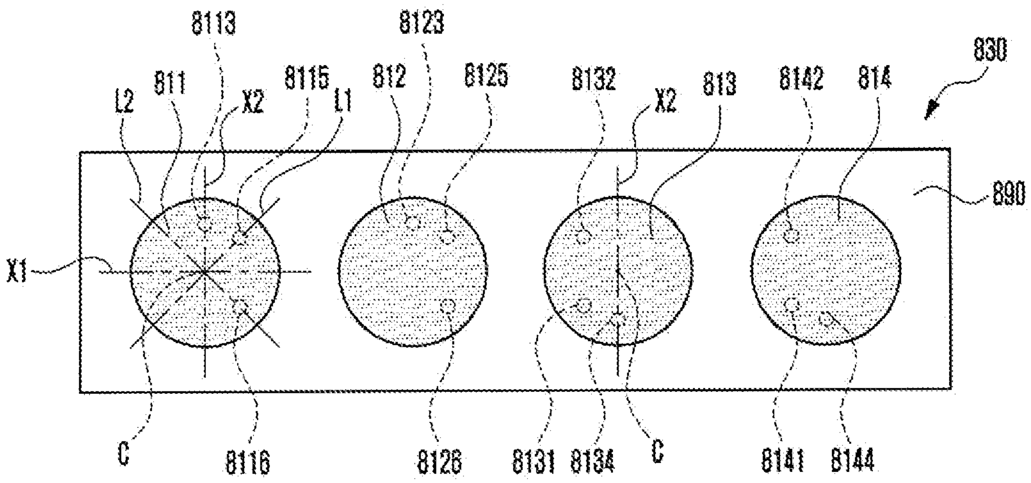

Referring to FIG. 8C, the antenna module 830 may include the first conductive patch 811 and the second conductive patch 812 of which the feeders 8115, 8116, 8125, 8126 of the first structure are arranged on the second area (e.g., the right area) with reference to the virtual second axis X2. According to an embodiment, the antenna module 810 may include the third conductive patch 813 and the fourth conductive patch 814 of which the feeders 8131, 8132, 8141, and/or 8142 of the first structure are arranged on the first area (e.g., the left area) with reference to the virtual second axis X2. According to an embodiment, the antenna module 830 may include the first conductive patch 811 and the second conductive patch 812 of which the feeders 8113 or 8123 of the second structure are arranged on the third area (e.g., the upper area) with reference to the virtual first axis X1. According to an embodiment, the antenna module 830 may include the third conductive patch 813 and the fourth conductive patch 814 of which the feeder 8134 or 8144 of the second structure are arranged on the fourth area (e.g., the lower area) opposite to the third area (e.g., the upper area) with reference to the virtual first axis X1.

Figure 8D:
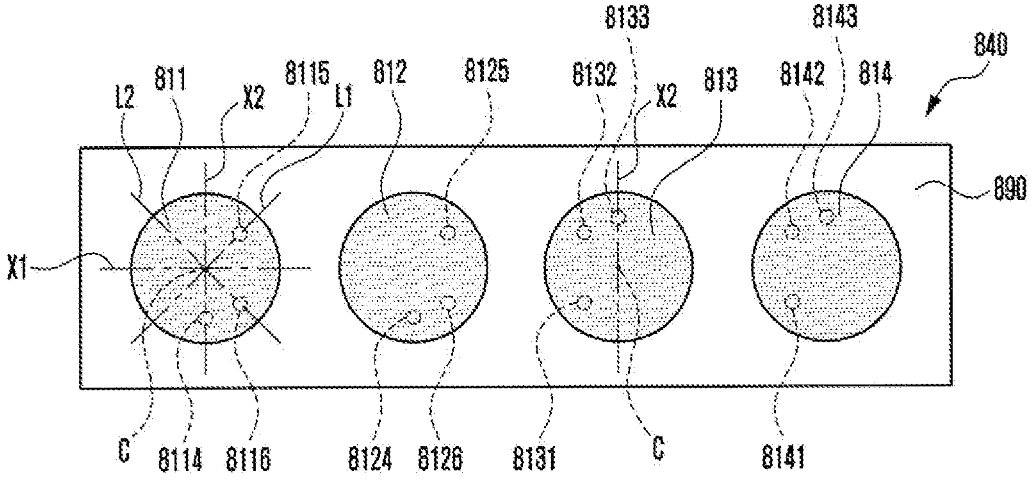

Referring to FIG. 8D, the antenna module 840 may include the first conductive patch 811 and the second conductive patch 812 of which the feeders 8115, 8116, 8125, and/or 8126 of the first structure are arranged on the second area (e.g., the right area) with reference to the virtual second axis X2. According to an embodiment, the antenna module 810 may include the third conductive patch 813 and the fourth conductive patch 814 of which the feeders 8131, 8132, 8141, and/or 8142 of the first structure are arranged on the first area (e.g., the left area) opposite to the second area (e.g., the right area) with reference to the virtual second axis X2. According to an embodiment, the antenna module 840 may include the first conductive patch 811 and the second conductive patch 812 of which the feeder 8114 or 8124 of the second structure is arranged on the fourth area (e.g., the lower area) with reference to the virtual first axis X1. According to an embodiment, the antenna module 840 may include the third conductive patch 813 and the fourth conductive patch 814 of which the feeder 8133 or 8143 of the second structure is arranged on the third area (e.g., the upper area) with reference to the virtual first axis X1.

According to certain embodiments, the conductive patches included in the antenna module may include feeders of the first structure arranged on the third area (e.g., the upper area) (or the fourth area (e.g., the lower area)) with reference to the virtual first axis X1.

According to certain embodiments, the conductive patches included in the antenna module may include feeders of the first structure arranged on the first area (e.g., the left area) (or the second area (e.g., the right area)) with reference to the virtual second axis X2.

Figure 9:
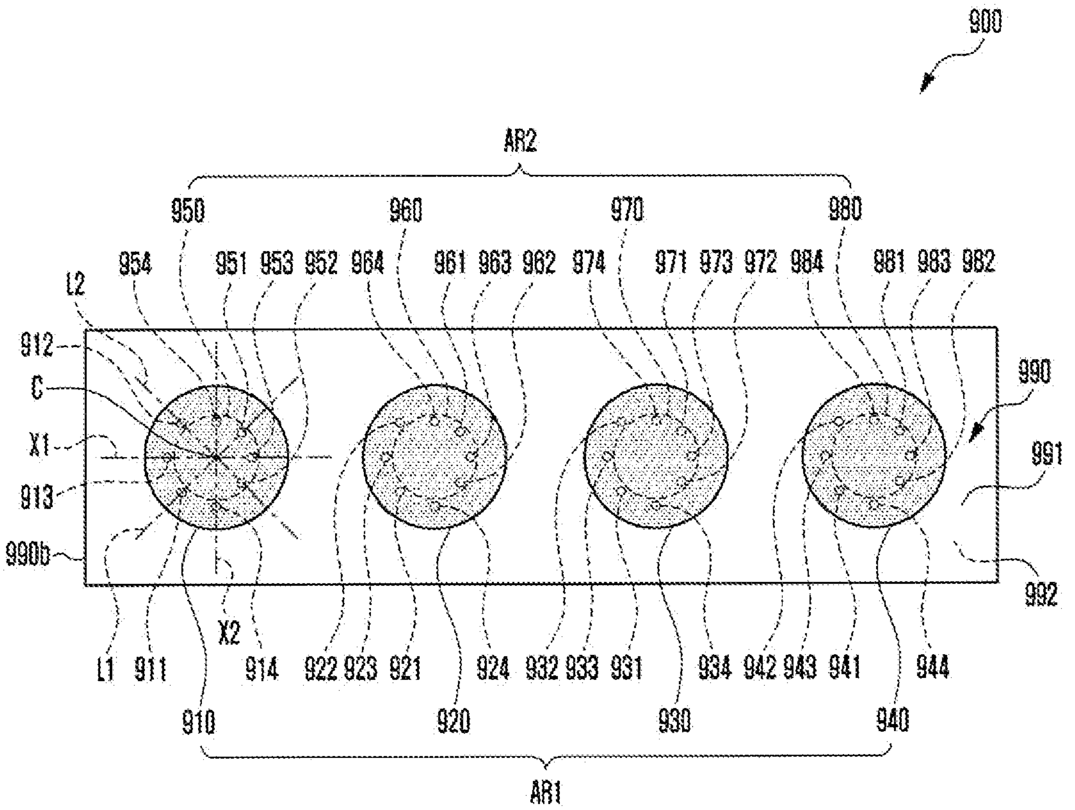
FIG. 9 illustrates a configuration diagram of an antenna module having an arrangement configuration of a feeder for supporting a multi-band according to an embodiment of the disclosure.

FIG. 9 illustrates a configuration diagram of an antenna module 900 having an arrangement structure of a feeder for supporting a multi-band according to an embodiment of the disclosure. According to an embodiment, the antenna module 900 of FIG. 9 may be at least partially similar to the third antenna module 246 in FIG. 2 or may include other embodiments of an antenna module.

Referring to FIG. 9, the antenna module 900 may include a first antenna array AR1 for supporting a first frequency band (e.g., 28 GHz) and a second antenna array AR2 for supporting a second frequency band (e.g., 39 GHz). According to an embodiment, multiple conductive patches 910, 920, 930, and/or 940 included in the first antenna array may be disposed on a first layer of the printed circuit board 990. For example, the multiple conductive patches 910, 920, 930, and/or 940 included in the first antenna array AR1 may be formed on a first surface 991 of the printed circuit board 990. According to an embodiment, multiple conductive patches 950, 960, 970, and/or 980 included in the second antenna array AR2 may be formed on a second layer different from the first layer of the printed circuit board 990. For example, the multiple conductive patches 950, 960, 970, and/or 980 included in the second antenna array AR2 may be formed inside the printed circuit board 990. According to an embodiment, the antenna module 900 may include a wireless communication circuit arranged on the second surface 992 facing a direction opposite to the first surface 991 of the printed circuit board 990. According to an embodiment, the multiple conductive patches 910, 920, 930, 940, 950, 960, 970, and/or 980 may be electrically connected to the wireless communication circuit.

According to an embodiment, the antenna array AR1 may include a first conductive patch 910, a second conductive patch 920, a third conductive patch 930, or a fourth conductive patch 940 which is arranged at predetermined intervals on the first layer (e.g., the first surface 991) of the printed circuit board 990. The conductive patches 910, 920, 930, and/or 940 may have substantially the same configuration.

According to an embodiment, the first antenna array AR1 may operate as a dual polarized antenna through feeders arranged on each of the multiple conductive patches 910, 920, 930, and/or 940. According to an embodiment, the conductive patches 910, 920, 930, and/or 940 may have a shape that is vertically and horizontally symmetrical in order to operate as a dual polarized antenna. For example, the conductive patches 910, 920, 930, and/or 940 may be formed in a square, circular, or regular octagonal shape. According to an embodiment, the first conductive patch 910 may include a first feeder 911, a second feeder 912, a third feeder 913 and/or a fourth feeder 914. According to an embodiment, the second conductive patch 920 may include a fifth feeder 921, a sixth feeder 922, a seventh feeder 923 and/or an eighth feeder 924. According to an embodiment, the third conductive patch 930 may include a ninth feeder 931, a tenth feeder 932, an 11th feeder 933, and a 12th feeder 934. According to an embodiment, the fourth conductive patch 940 may include a 13th feeder 941, a 14th feeder 942, a 15th feeder 943, and a 16th feeder 944.

According to an embodiment, the first conductive patch 910 may include the first feeder 911 and the second feeder 912 of the first structure (e.g., "X" shaped power feeding polarization structure) and the third feeder 913 and the fourth feeder 914 of the second structure (e.g., "+" shaped power feeding polarization structure). According to an embodiment, the first conductive patch 910 may include a first axis X1 passing the center C of the first conductive patch 510 and substantially parallel with the first side 990*a* of the printed circuit board 990 and a second axis X2 passing the center of the first conductive patch 910 and substantially parallel with the second side 990*b* of the printed circuit board 990. According to an embodiment, the first feeder 911 may be arranged at a first point on a first virtual line L1 passing the center C of the first conductive patch 910 and having a slope inclined at a first angle $\theta_1$ (e.g., 45°) with respect to the virtual second axis X2. According to an embodiment, the second feeder 912 may be arranged at a second point on a second virtual line L2 passing the center C of the first conductive patch 910 and having a slope inclined at a second angle $\theta_2$ (e.g., −45°) with respect to the virtual second axis X2. In this example, the sum of the first angle $\theta_1$ and the second angle $\theta_2$ may be substantially perpendicular (90°). According to an embodiment, the third feeder 913 may be disposed at a third point on the virtual first axis X1 passing the center C of the first conductive patch 910. According to an embodiment, the fourth feeder 914 may be disposed at a fourth point on the virtual second axis X2 passing the center C of the first conductive patch 910.

According to an embodiment, the second conductive patch 920, the third conductive patch 930, and/or the fourth conductive patch 940 included in the first antenna array AR1 may include feeders 921, 922, 923, 924, 931, 932, 933, 934, 941, 942, 943, and/or 944 arranged as substantially the same as the first conductive patch 910.

According to various embodiments, the second antenna array AR2 may operate as a dual polarized antenna through feeders arranged on each of the multiple conductive patches 950, 960, 970, and/or 980. According to an embodiment, the conductive patches 950, 960, 970, and/or 980 may have a shape that is vertically and horizontally symmetrical structure in order to operate as a dual polarized antenna. For example, the conductive patches 950, 960, 970, and/or 980 may be formed in a square, circular, or regular octagonal shape. According to an embodiment, a fifth conductive patch 950 may include a 21st feeder 951, a 22nd feeder 952, an 23rd feeder 953, and a 24th feeder 954. According to an embodiment, a sixth conductive patch 960 may include a 25th feeder 961, a 26th feeder 962, an 27th feeder 963, and a 28th feeder 964. According to an embodiment, the seventh conductive patch 970 may include a 29th feeder 971, a 30th feeder 972, a 31st feeder 973, and a 32nd feeder 974. According to an embodiment, the eighth conductive patch 980 may include a 33rd feeder 981, a 34th feeder 982, a 35th feeder 983, and a 36th feeder 984.

According to an embodiment, the fifth conductive patch 950 may include the 21st feeder 951 and the 22nd feeder 952 which have the first structure, and the 23rd feeder 953 and the 24th feeder 954 which have the second structure. According to an embodiment, the 21st feeder 951 may be arranged at a fifth point on the first virtual line L1 passing the center C of the fifth conductive patch 950 and having a slope inclined at a first angle $\theta_1$ (e.g., 45°) with respect to the virtual second axis X2. According to an embodiment, the 22nd feeder 952 may be arranged at a sixth point on the second virtual line L2 passing the center C of the fifth conductive patch 950 and having a slope inclined at a second angle $\theta_2$ (e.g., −45°) with respect to the virtual second axis X2. In this example, the sum of the first angle $\theta_1$ and the second angle $\theta_2$ may be substantially perpendicular (90°). According to an embodiment, the 23rd feeder 953 may be disposed at a seventh point on the virtual first axis X1 passing the center C of the fifth conductive patch 950. According to an embodiment, the 24th feeder 954 may be disposed at an eighth point on the virtual second axis X2 passing the center C of the fifth conductive patch 950.

According to an embodiment, the sixth conductive patch 960, the seventh conductive patch 970, and/or the eighth conductive patch 980 included in the second antenna array may include feeders 961, 962, 963, 964, 971, 972, 973, 974, 981, 982, 983, and/or 984 arranged as substantially the same as the fifth conductive patch 950.

According to an embodiment, the feeders 911, 912, 913, 914, 921, 922, 923, 924, 931, 932, 933, 934, 941, 942, 943, and/or 944 included in the multiple conductive patches 910, 920, 930, and/or 940 included in the first antenna array AR1 and/or the feeders 951, 952, 953, 954, 961, 962, 963, 964, 971, 972, 973, 974, 981, 982, 983, and/or 984 included in the multiple conductive patches 950, 960, 970, and/or 980 included in the second antenna array AR2 may be selectively operated based on a wireless state of an electronic device (e.g., the electronic device 300 in FIG. 3) including the antenna module 900. For example, the multiple conductive patches 910, 920, 930, and/or 940 included in the first antenna array AR1 may activate, based on the wireless state of the electronic device, the feeders 911, 912, 921, 922, 931, 932, 941, and/or 942 of the first structure and the feeders 913, 923, 933, and/or 943 (or 914, 924, 934, and/or 944) of the second structure, which are disposed on the first axis X1 (or the second axis X2). By way of example, the wireless state of the electronic device may include reference signal received power (RSRP), a channel quality indicator (CQI), and/or quality of service (QoS).

Figure 10A:
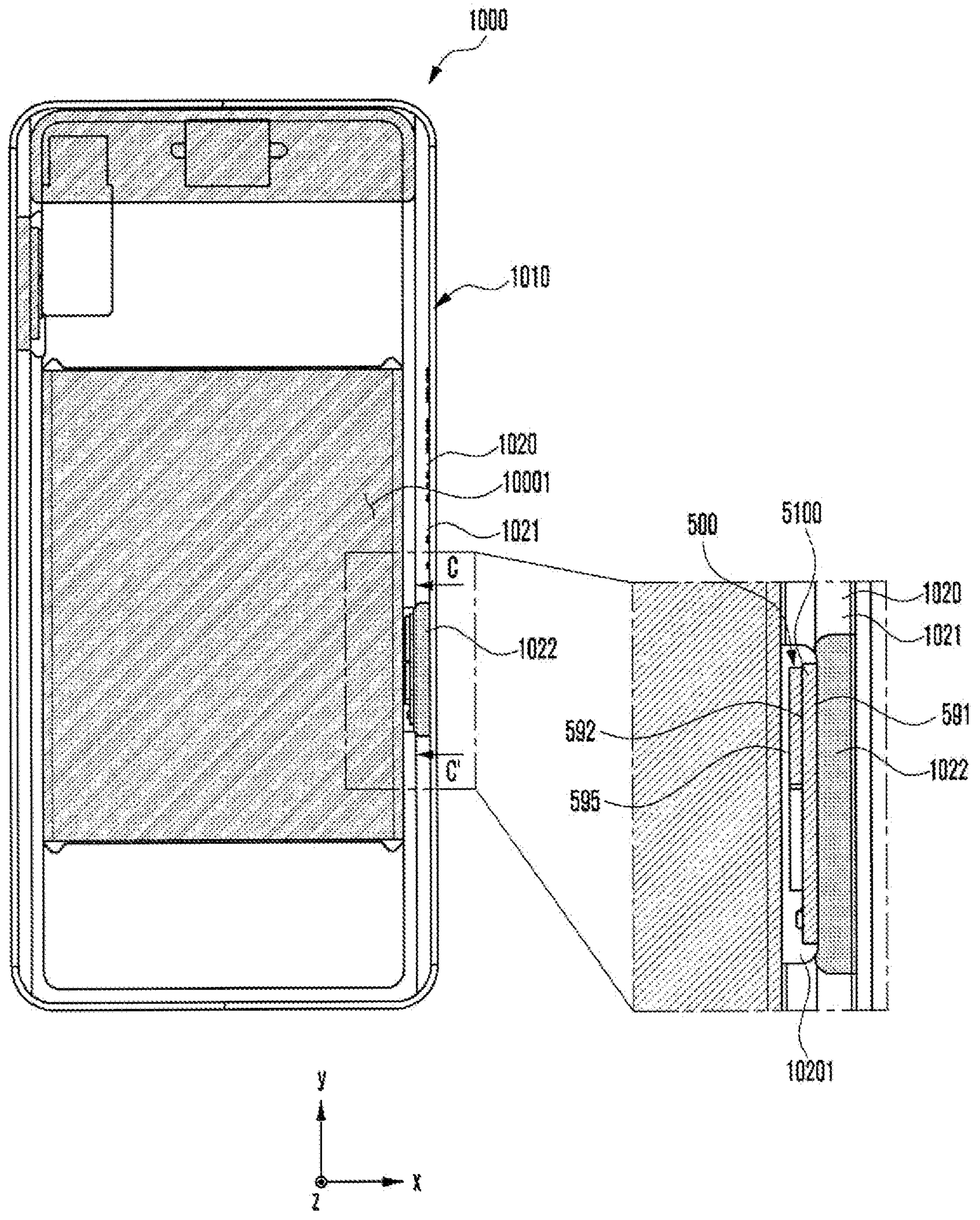
FIG. 10A is a view illustrating a state in which an antenna module is disposed in an electronic device according to an embodiment of the disclosure.

FIG. 10A is a view illustrating a state in which an antenna module 500 is disposed in an electronic device 1000 according to an embodiment of the disclosure. According to an embodiment, the electronic device 1000 in FIG. 10A may be at least partially similar to the electronic device 101 in FIG. 1 or FIG. 2 or the electronic device 300 in FIG. 3A or may additionally include other embodiments of an electronic device.

Referring to FIG. 10A, the electronic device 1000 may include a housing 1010 including a front plate (e.g., the front plate 302 in FIG. 3A) facing a first direction (e.g., Z direction in FIG. 3A), a rear plate (e.g., the rear plate 311 in FIG. 3B) facing an opposite direction (e.g., −Z direction in FIG. 3A) to the front plate, and a lateral member 1020 surrounding a space 10001 (or internal space) between the front plate and the rear plate. According to an embodiment, the lateral member 1020 may include an at least partially disposed conductive part 1021 and a polymer part 1022 (e.g., non-conductive part) insert-injected in the conductive part 1021. For another embodiment, the polymer part 1022 may be replaced with empty space or other dielectric material.

According to an embodiment, the antenna module 500 may be disposed so that conductive patches (e.g., the conductive patches 510, 520, 530, and/or 540 in FIG. 5A) face the lateral member 1020 in the internal space 10001 of the electronic device 1000. For example, the antenna module 500 may be mounted on a module mounting part 10201 provided on the lateral member 1020 so that the first surface 591 of the printed circuit board 590 faces the lateral member 1020. According to an embodiment, the polymer part 1022 (e.g., a polymer member) may be disposed at least a partial area of the lateral member 1020 facing the antenna module 500 so that a beam pattern is formed in a direction (e.g., X direction) in which the lateral member 1020 faces.

Figure 10B:
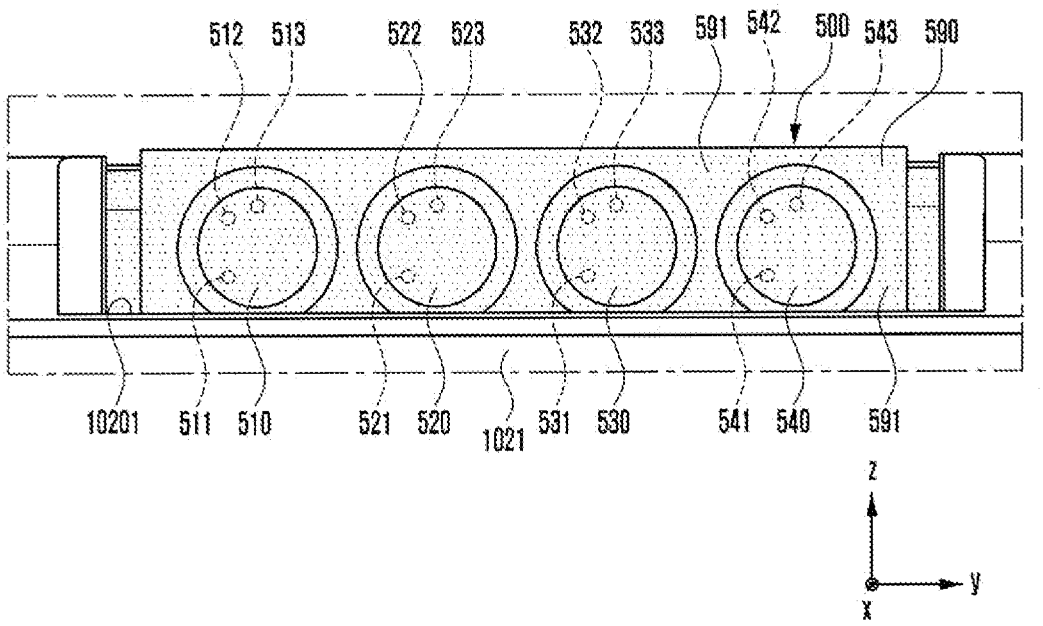
FIG. 10B illustrates a partial sectional view of an electronic device viewed from line C-C' of FIG. 10A according to an embodiment of the disclosure.

FIG. 10B illustrates a partial sectional view of an electronic device 1000 viewed from line C-C' of FIG. 10A according to an embodiment of the disclosure. According to an embodiment, FIG. 10B is a view illustrating the antenna module 500 that is visible from the outside of the lateral member 1020, where the polymer part 1022 of FIG. 10A is omitted.

Referring to FIG. 10B, the printed circuit board 590 of the antenna module 500 may be mounted to the module mounting part 10201 of the lateral member 1020 to include an area at least partially overlapping the conductive part 1021 when viewing the lateral member 1020 from the outside. Therefore, to accommodate the mounting of the printed circuit board 590, the thickness of the electronic device 1000 may not need to be increased and the printed circuit board 590 may be solidly seated in the lateral member 1020.

According to an embodiment, when viewing the lateral member (e.g., the lateral member 1020 in FIG. 10A) from the outside, at least a portion of the printed circuit board 590 may be disposed to overlap the conductive part 1021. According to an embodiment, when viewing the lateral member 1020 from the outside, the conductive patches 510, 520, 530, and/or 540 of the antenna module 500 may be arranged not to overlap the conductive part 1021. According to an embodiment, when viewing the lateral member 1020 from the outside, the conductive patches 510, 520, 530, and/or 540 of the antenna module 500 may be arranged to at least partially overlap the conductive part 1021. Here, when viewing the lateral member 1020 from the outside, the conductive patches 511, 512, 513, 521, 522, 523, 531, 532, 533, 541, 542, and/or 543 may be arranged on a location not overlapping the conductive part 1021.

Figure 11A:
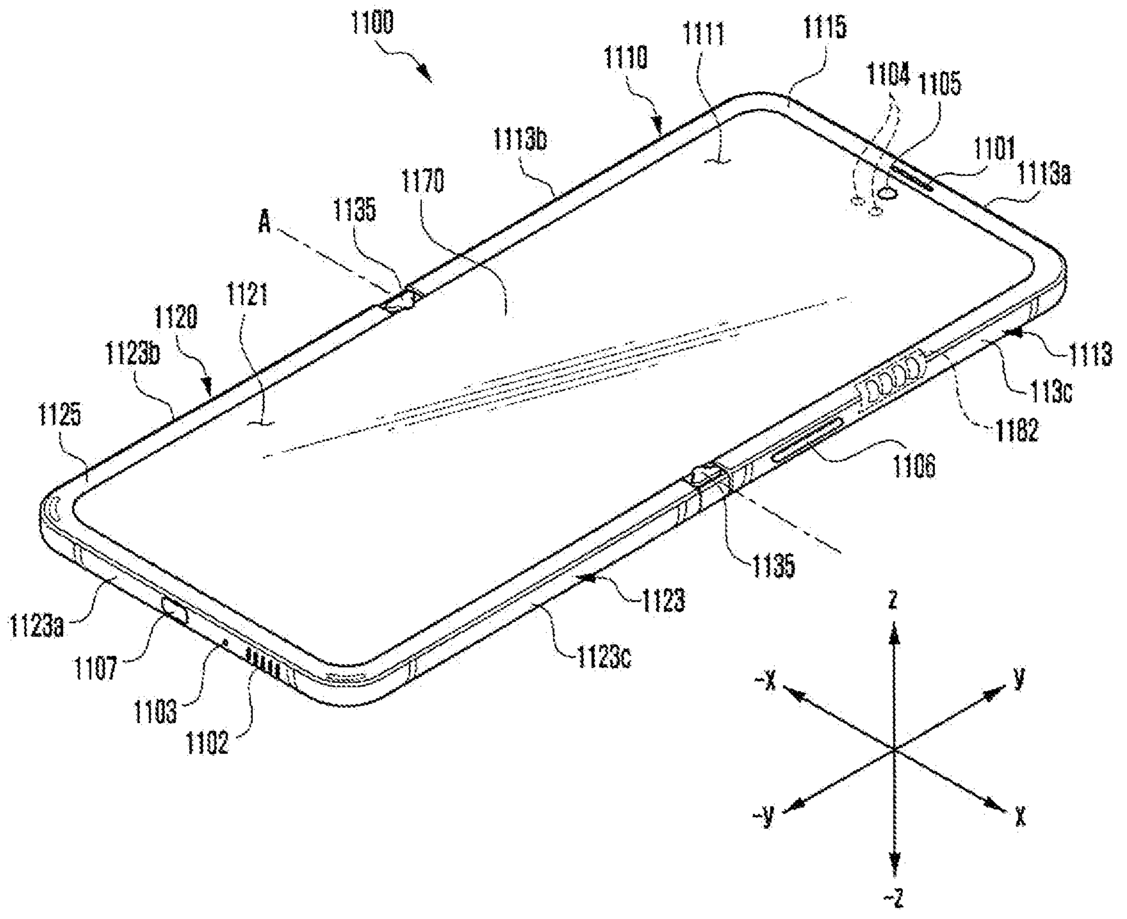
FIG. 11A is a front perspective diagram of an electronic device, illustrating an unfolding state (or a flat state) according to an embodiment of the disclosure.
Figure 11B:
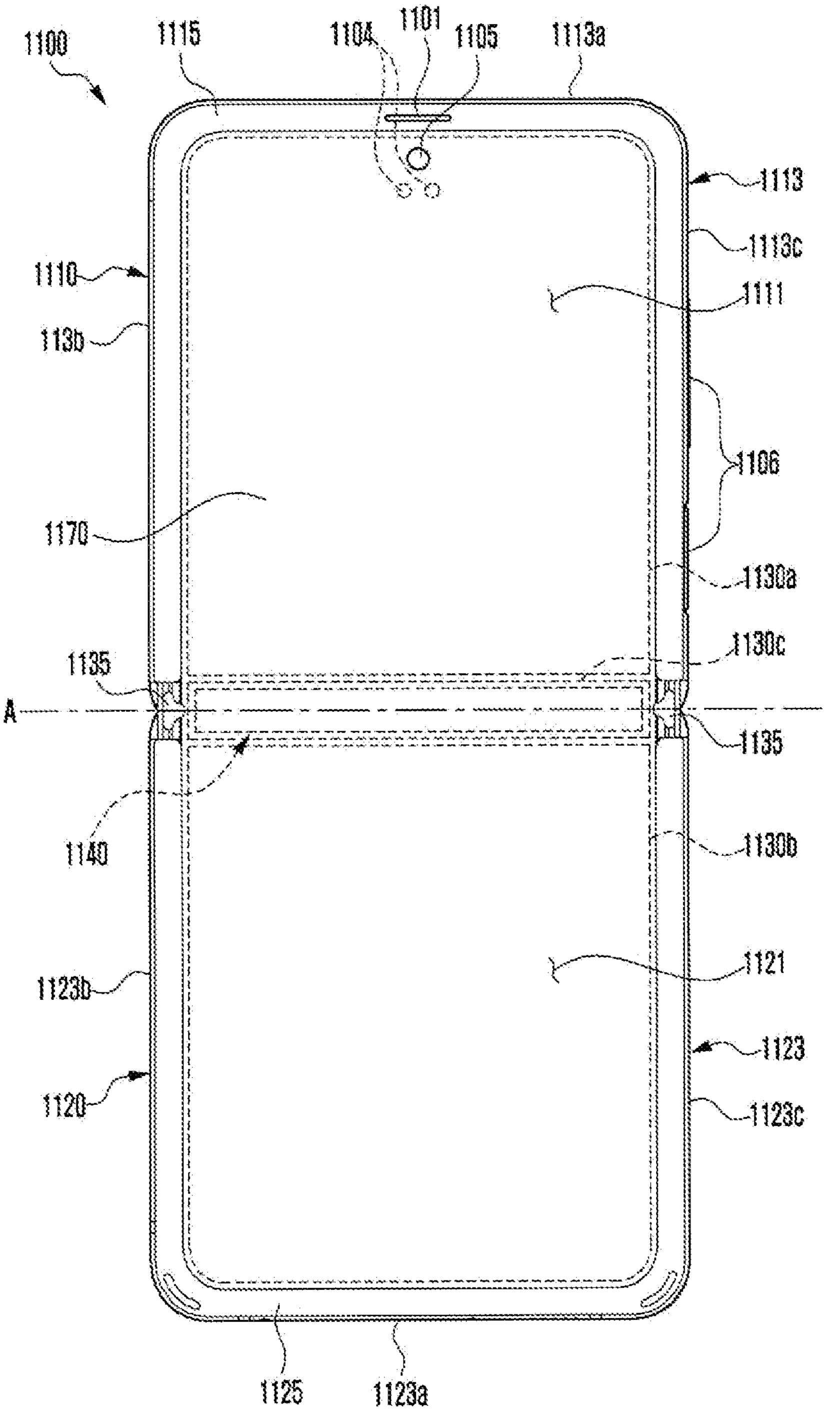
FIG. 11B is a planar view illustrating a front surface of an electronic device in an unfolding state according to an embodiment of the disclosure.
Figure 11C:
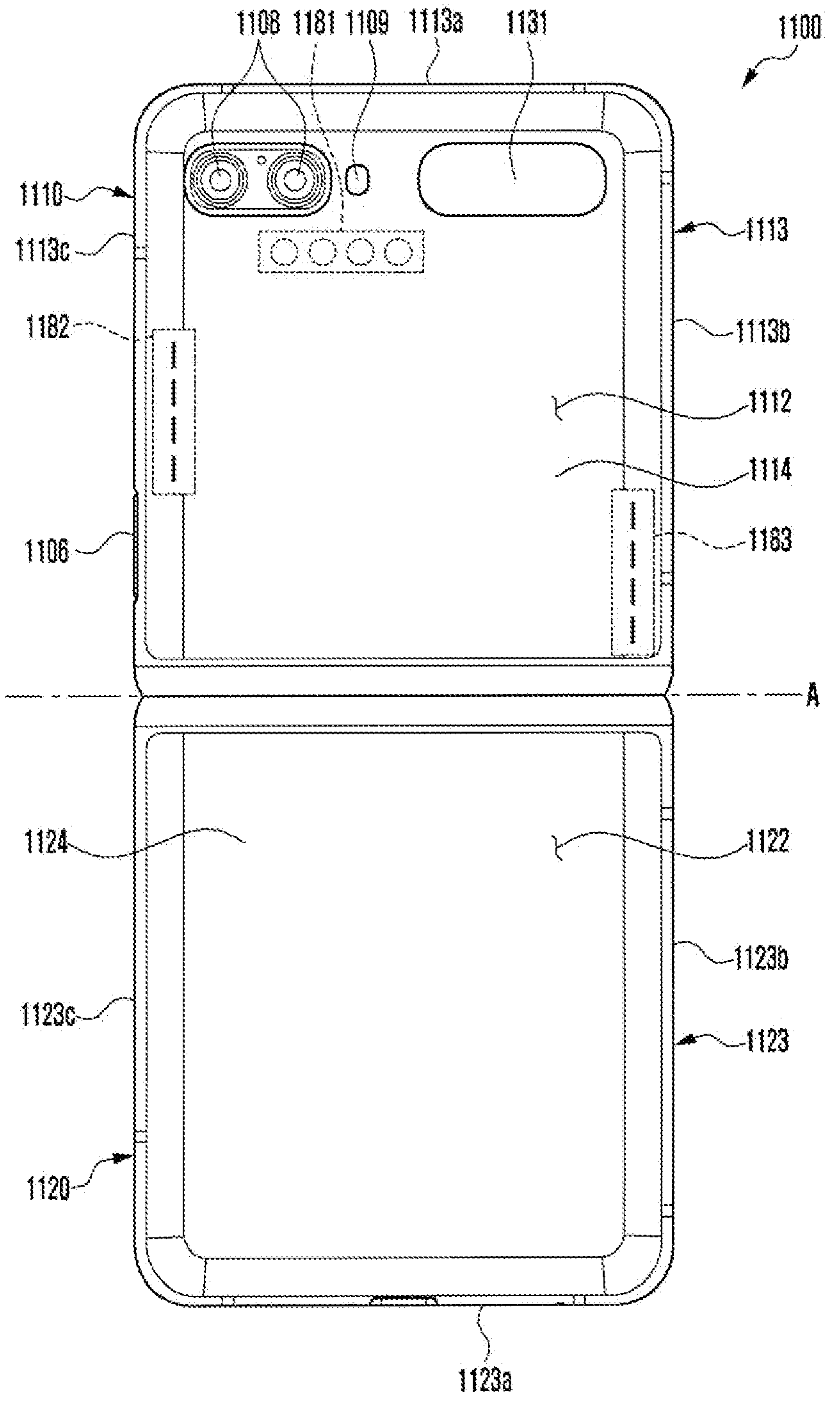
FIG. 11C is a planar view illustrating a rear surface of an electronic device in an unfolding state according to an embodiment of the disclosure.
Figure 11D:
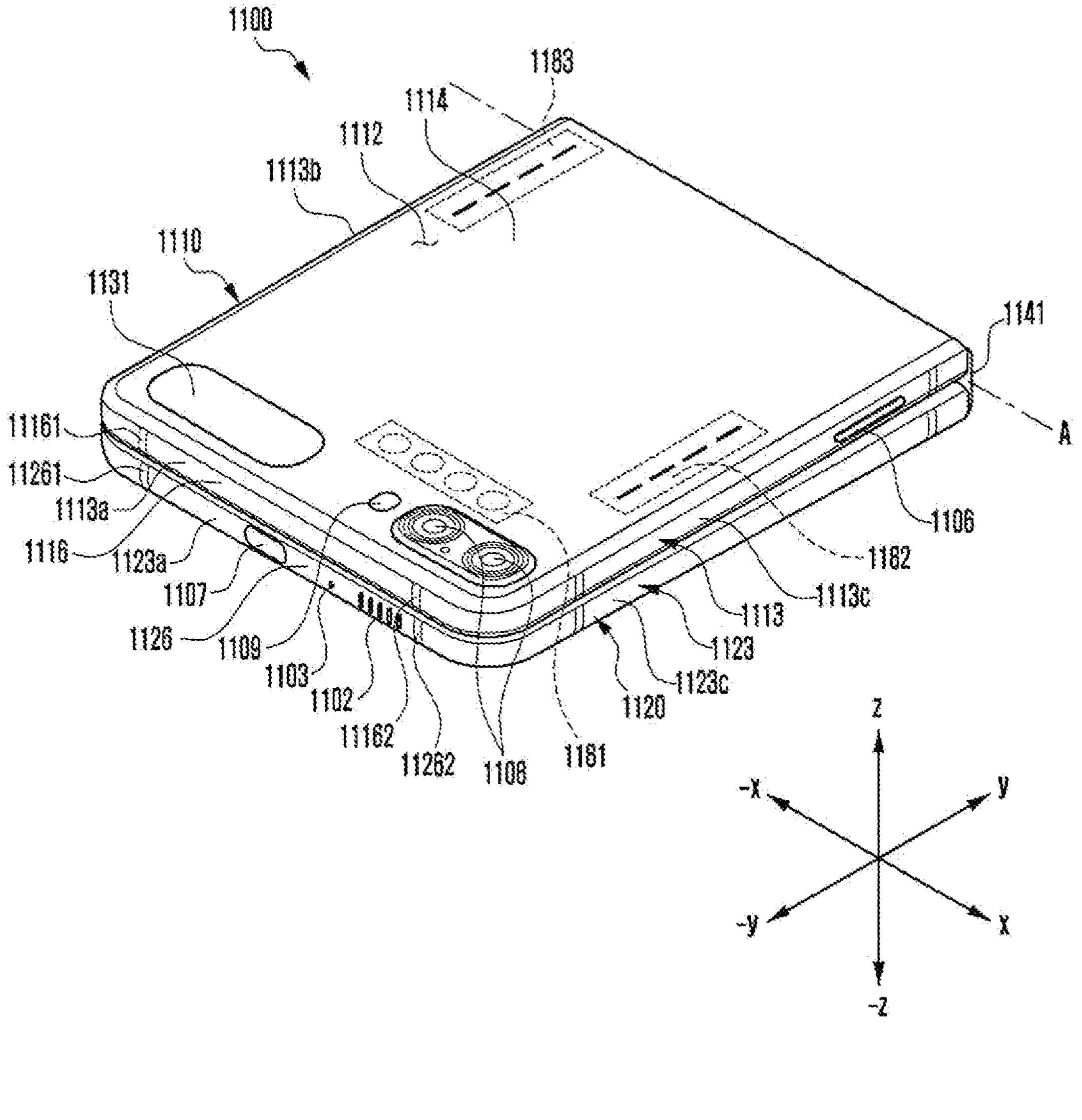
FIG. 11D is a front perspective diagram of an electronic device, illustrating a folding state according to an embodiment of the disclosure.

FIG. 11A is a front perspective diagram of an electronic device 1100, illustrating an unfolding state (or a flat state) according to an embodiment of the disclosure. FIG. 11B is a planar view illustrating a front surface of an electronic device 1100 in an unfolding state according to an embodiment of the disclosure. FIG. 11C is a planar view illustrating a rear surface of an electronic device 1100 in an unfolding state according to an embodiment of the disclosure. FIG. 11D is a front perspective diagram of an electronic device 1100, illustrating a folding state according to an embodiment of the disclosure. According to an embodiment, the electronic device 1100 in FIG. 11A to FIG. 11D may be at least partially similar to the electronic device 101 in FIG. 1 or FIG. 2 or may additionally include other embodiments of an electronic device.

Referring to FIG. 11A to FIG. 11D, the electronic device 1100 may include a pair of housing 1110, 1120 (e.g., a foldable housing) rotatably coupled to be folded while facing each other with reference to a hinge module (e.g., the hinge module 1140 in FIG. 11B). In some embodiments, the hinge module 1140 may be disposed in a direction of the X axis or in a direction of the Y axis. In some embodiments, two or more hinge modules 1140 may be arranged to be folded in the same direction or different directions. According to an embodiment, the electronic device 1100 may include a flexible display 1170 (e.g., a foldable display) disposed on an area formed by the pair of housings 1110, 1120. According to an embodiment, a first housing 1110 and a second housing 1120 are arranged on opposite sides around a folding axis (A-axis) and have substantially symmetric shapes with respect to the folding axis (A-axis). According to an embodiment, an angle or a distance between the first housing 1110 and the second housing 1120 may vary according to whether a state of the electric device 1100 is an unfolded state (a flat state or unfolding state), a folded state (folding state), or an intermediate state.

According to an embodiment, the pair of housings 1110, 1120 may include the first housing 1110 (e.g., a first housing structure) coupled to the hinge module 1140 and the second housing 1120 (e.g., a second housing structure) coupled to the hinge module 1140. According to an embodiment, the first housing 1110 may include a first surface 1111 facing a first direction (e.g., a front direction) (the z-axial direction) and a second surface 1112 facing a second direction (e.g., a rear direction) (the −z-axial direction) opposite to the first surface 1111. According to an embodiment, the second housing 1120 may include a third surface 1121 facing the first direction (the z-axial direction) and a fourth surface 1122 facing the second direction (the −z-axial direction). According to an embodiment, the electronic device 1100 may operate in a manner in which the first surface 1111 of the first housing 1110 and the third surface 1121 of the second housing 1120 face substantially the same first direction (the z-axial direction) in the unfolded state, and the first surface 1111 and the third surface 1121 face each other in the folded state. According to an embodiment, the electronic device 1100 may operate so that the second surface 1112 of the first housing 1110 and the fourth surface 1122 of the second housing 1120 face substantially the same second direction (the −z-axial direction) in the unfolded state, and the second surface 1112 and the fourth surface 1122 face opposite directions in the folded state. For example, in the folded state, the second surface 1112 may face the first direction (the z-axial direction) and the fourth surface 1122 may face the second direction (the −z-axial direction).

According to an embodiment, the first housing 1110 may include a first lateral frame 1113 at least partially forming the exterior of the electronic device 1100 and a first rear cover 1114 coupled to the first lateral frame 1113 and forming at least a portion of the second surface 1112 of the electronic device 1100.

According to an embodiment, the second housing 1120 may include a second lateral frame 1123 at least partially forming the exterior of the electronic device 1100 and a second rear cover 1124 coupled to the second lateral frame 1123 and forming at least a portion of the fourth surface 1122 of the electronic device 1100.

According to an embodiment, the pair of housings 1110, 1120 are not limited to the shape and combination described above and may be implemented by another shape or a combination and/or coupling of components.

According to an embodiment, the first lateral frame 1113 and/or the second lateral frame 1123 may be made of metal or additionally include polymer injected in metal. According to an embodiment, the first lateral frame 1113 and/or the second lateral frame 1123 may include at least one conductive part 1116 and/or 1126 electrically segmented through at least one segmentation part 11161, 11162 and/or 11261, 11262 formed of a polymer. For example, at least one conductive part 1116 and/or 1126 may be electrically connected to a wireless communication circuit included in the electronic device 1100 to be used as an antenna operating in at least one predetermined band (e.g., a legacy band).

According to an embodiment, the first rear cover 1114 and/or the second rear cover 1124 may be made of, for example, at least one of coated or colored glass, ceramic, polymers, or metals (e.g., aluminum, stainless steel (STS), or magnesium), or a combination of two or more thereof.

According to an embodiment, the flexible display 1170 may be disposed to extend from the first surface 1111 of the first housing 1110 passing through the hinge module 1140 to at least a portion of the third surface 1121 of the second housing 1120. According to an embodiment, the electronic device 1100 may include a first protection cover 1115 (e.g., a first protection frame or a first decoration member) coupled along an edge of the first housing 1110. According to an embodiment, the electronic device 1100 may include a second protection cover 1125 (e.g., a second protection frame or a second decoration member) coupled along an edge of the second housing 1120. According to an embodiment, the first protection cover 1115 and/or the second protection cover 1125 may be formed of a metal or polymer material. According to an embodiment, the first protection cover 1115 and/or the second protection cover 1125 may be used as a decoration member. According to an embodiment, the flexible display 1170 may be located so that an edge of the flexible display 1170 corresponding a protection cap is protected through the protection cap 1135 disposed on an area corresponding to the hinge module 1140. Accordingly, the edge of the flexible display 1170 may be substantially protected from the outside. According to an embodiment, the electronic device 1100 may include a hinge housing 1141 (e.g., a hinge cover) which supports the hinge module 1140, is exposed to the outside in case that the electronic device 1100 is in the folded state, and is inserted into a first space (e.g., the internal space of the first housing 1110) and a second space (e.g., the internal space of the second housing 1120) in case that the electronic device is in the unfolded state so as not be seen from the outside. In some embodiments, the flexible display 1170 may be disposed to extend from at least a portion of the second surface 1112 to at least a portion of the fourth surface 1122. Here, the electronic device 1100 may be folded so that the flexible display 1170 may be visually exposed to the outside (an out-folding manner).

According to an embodiment, the electronic device 1100 may include a sub display 1131 disposed separately from the flexible display 1170. According to an embodiment, the sub display 1131 is disposed on the second surface 1112 of the first housing 1110 to be at least partially exposed and thus display state information, which substitutes for a display function of the flexible display 1170, of the electronic device 1100 in the folded state. According to an embodiment, sub display 1131 may be disposed to be seen from the outside through at least a portion of the first rear cover 1114. In some embodiments, the flexible display 1131 may be disposed on the fourth surface 1122 of the second housing 1120. According to an embodiment, sub display 1131 may be disposed to be seen from the outside through at least a portion of the second rear cover 1124.

According to an embodiment, the electronic device 1100 may include at least one of an input device 1103 (e.g., microphone), a sound output device 1101 or 1102, a sensor module 1104, a camera device 1105 or 1108, a key input device 1106, or a connector port 1107. In the described embodiment, the input device 1103 (e.g., microphone), the sound output device 1101 or 1102, the sensor module 1104, the camera device 1105 or 1108, the key input device 1106, or the connector port 1107 indicate a hole or a shape formed on the first housing 1110 or the second housing 1120 but may be defined to include a substantial electronic components (e.g., an input device, a sound output device, a sensor module, or a camera device) arranged inside the electronic device 1100 and operating through a hole or a shape.

According to an embodiment, a camera device (e.g., the first camera device 1105) of the camera devices 1105 or 1108 or the sensor module 1104 may be disposed to be exposed through the flexible display 1170. For example, the first camera 1105 or the sensor module 1104 may be arranged to come in contact with an external environment through an opening (e.g., a through-hole) at least partially formed on the flexible display 1170 in the internal space of the electronic device 1100. For another example, a certain sensor module 1104 may be disposed in the internal space of the electronic device 1100 to perform functions thereof without being visually exposed through the flexible display 1170. For example, in this case, an opening of the flexible display 1170 in an area facing the sensor module may be unnecessary.

According to an embodiment, the electronic device 1100 may include multiple antenna modules 1181, 1182, and/or 1183 arranged in the first space (e.g., the internal space of the first housing 1110) and/or the second space (e.g., the internal space of the second housing 1120). According to an embodiment, the electronic device 1100 may include a first antenna module 1181 disposed on a first area (e.g., the upper end area) of the first space (or the second space), a second antenna module 1182 disposed on a first lateral surface 1113C of the first space, and/or a third antenna module 1183 disposed on a second lateral surface 1113*b* of the second space.

According to an embodiment, each antenna module 1181, 1182, or 1183 may include an antenna array including multiple conductive patches. According to an embodiment, the multiple conductive patches may include feeders (e.g., the first feeder 511 and the second feeder 512 in FIG. 5B) of the first structure and at least one feeder (e.g., the third feeder 513 in FIG. 5B) of the second structure. For example, an effect caused by at least one conductive part 1116 and/or 1126 of the first lateral frame 1113 and/or the second lateral frame 1123 on at least one of the antenna modules 1181, 1182, and/or 1183 may be changed based on a state (e.g., the unfolded state or folded state) of the electronic device 1100. Accordingly, the at least one antenna module may adaptively configure, based on a state (e.g., the unfolded state or folded state) of the electronic device 1100, the feeders of the first structure and the at least one feeder of the second structure as a feeder for transmitting and/or receiving a signal.

Figure 12A:
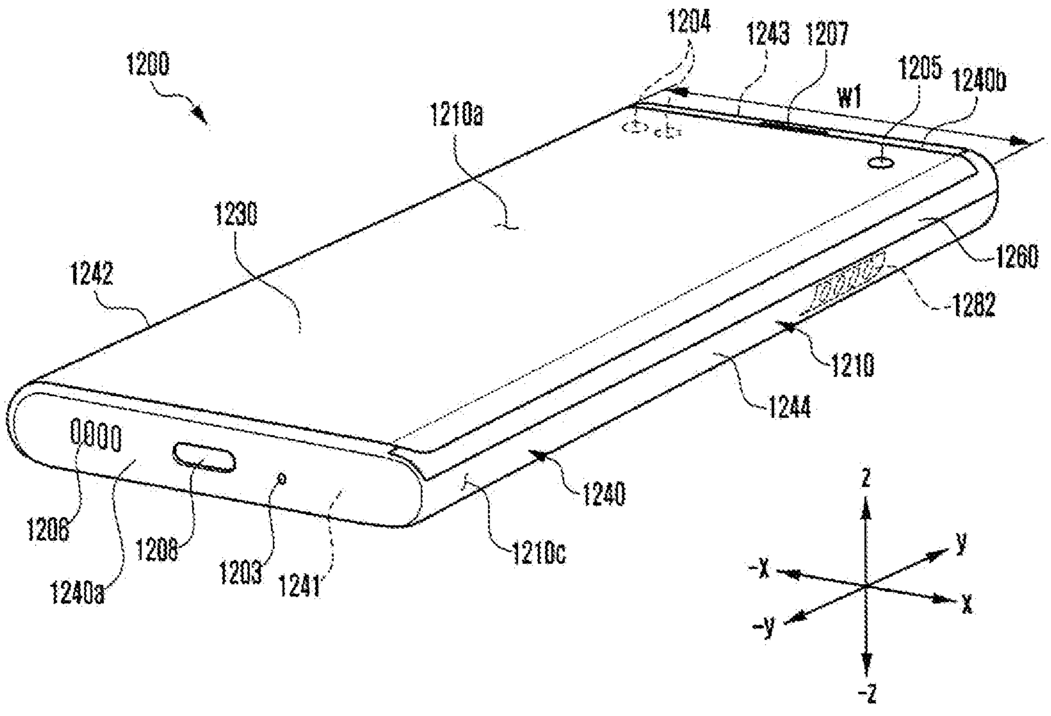
FIG. 12A and FIG. 12B are front perspective views of an electronic device, illustrating a closed state and an open state according to an embodiment of the disclosure.
Figure 12B:
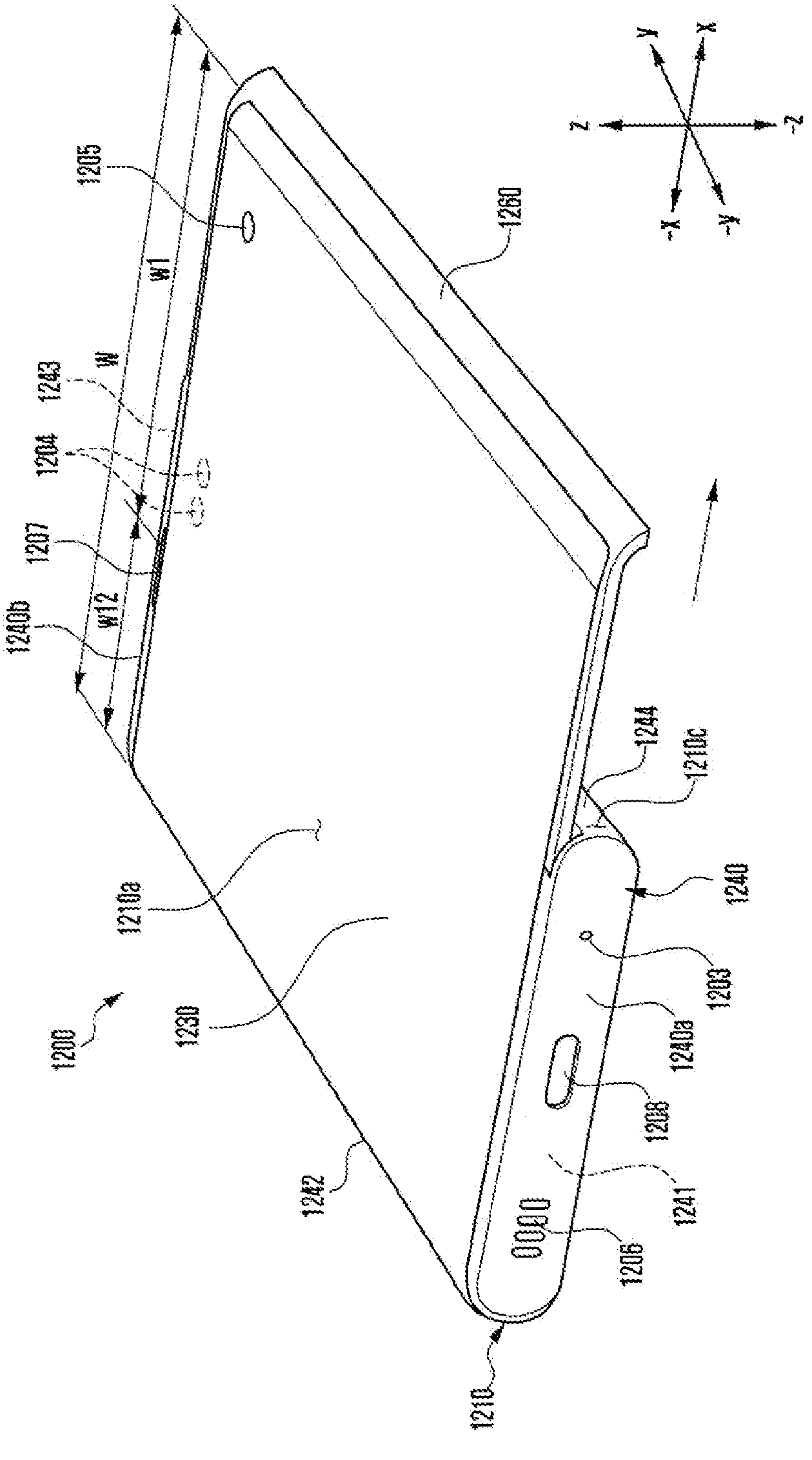
Figure 12C:
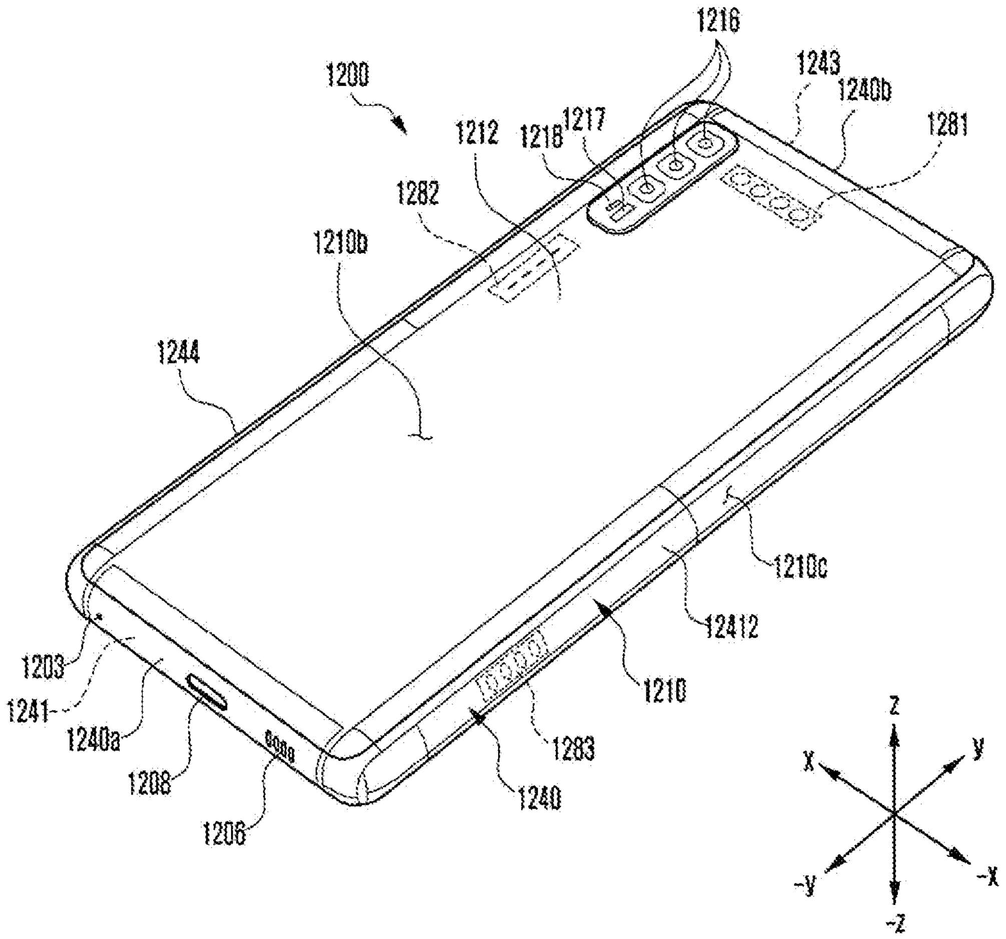
FIG. 12C and FIG. 12D are rear perspective views of an electronic device, illustrating a closed state and an open state according to an embodiment of the disclosure.
Figure 12D:
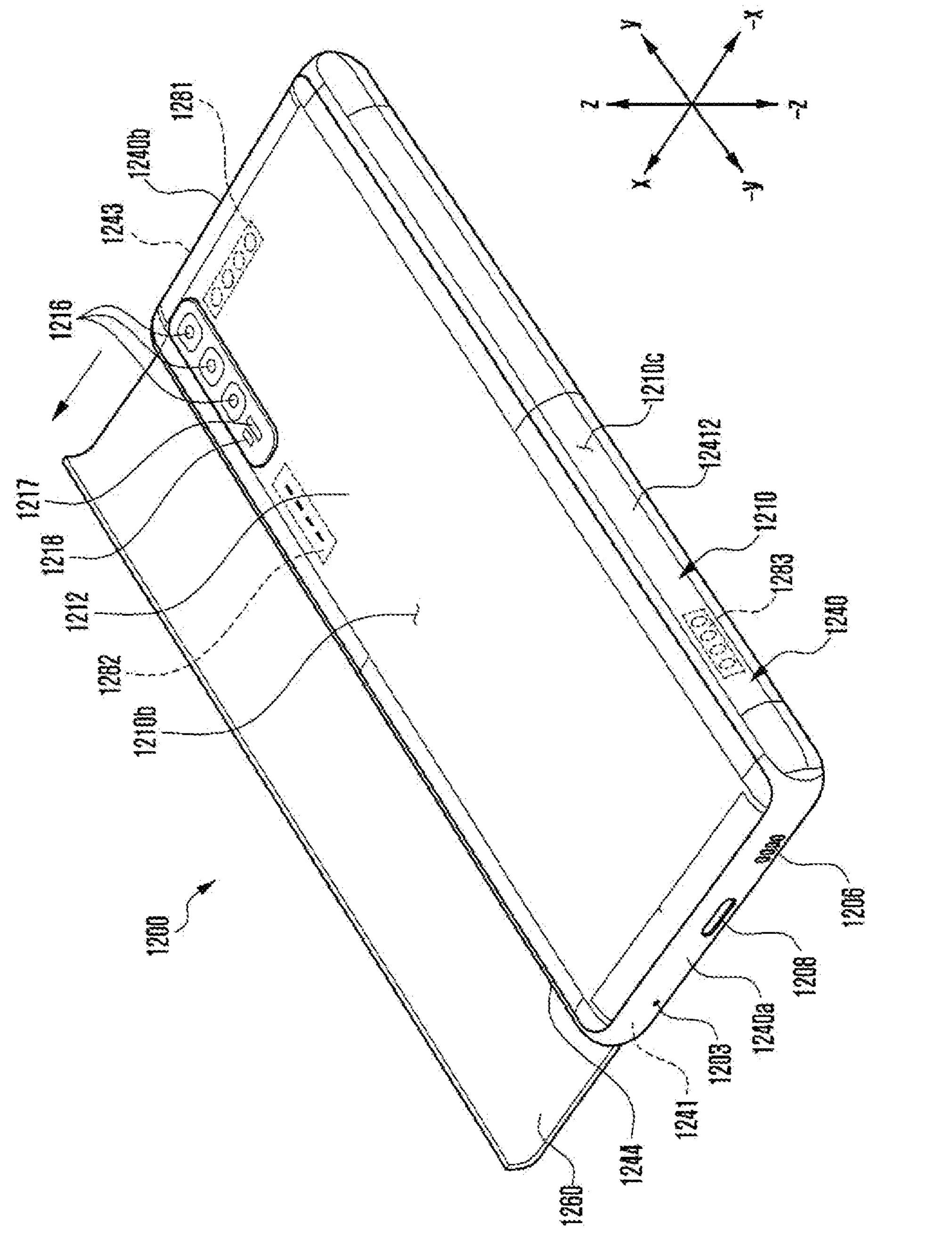

FIG. 12A and FIG. 12B are front perspective views of an electronic device 1200, illustrating a closed state and an open state according to an embodiment of the disclosure. FIG. 12C and FIG. 12D are rear perspective views of an electronic device 1200, illustrating a closed state and an open state according to an embodiment of the disclosure. According to an embodiment, the electronic device 1200 in FIG. 12A to FIG. 12D may be at least partially similar to the electronic device 101 in FIG. 1 or FIG. 2 or may additionally include other embodiments of an electronic device.

Referring to FIG. 12A to FIG. 12D, the electronic device 1200 may include a housing 1240 (e.g., a lateral frame) and a slide plate 1260 coupled to be at least partially movable from the housing 1240 and supporting at least a portion of the flexible display 1230. According to an embodiment, the slide plate 1260 may include a bendable hinge rail coupled to an end portion thereof. For example, in case that the slide plate 1260 performs a sliding operation on the housing 1240, the hinge rail may be inserted into the internal space of the housing 1240 while supporting the flexible display 1230. According to an embodiment, the electronic device 1200 may include a housing structure 1210 including a front surface 1210*a* (e.g., a first surface) facing a first direction (e.g., the Z-axial direction), a rear surface 1210*b* (e.g., a second surface) facing a second direction (e.g., the −Z-axial direction) opposite to the first direction, and a lateral surface 1210*c* surrounding a space between the front surface 1210*a* and the rear surface 1210*b* and at least partially exposed to the outside. According to an embodiment, the rear surface 1210*b* may be formed by the rear cover 1221 coupled to the housing 1240. According to an embodiment, the rear cover 1221 may be formed by coated or colored glass, ceramic, or a metal (e.g., aluminum, stainless steel (STS), or magnesium), or a combination of two or more thereof. In some embodiments, the rear surface 1210*b* may be integrally formed with the housing 1240. According to an embodiment, at least a portion of the lateral surface 1210*c* may be disposed to be exposed to the outside through the housing 1240.

According to an embodiment, the housing 1240 may include a first lateral surface 1241 having a first length, a second lateral surface 1242 extending in a direction perpendicular to the first lateral surface 1241 to have a second length longer than the first length, a third lateral surface 1243 extending parallel with the first lateral surface 1241 from the second lateral surface 1242 to have the first length, and a fourth lateral surface 1244 extending parallel with the second lateral surface 1242 from the third lateral surface 1243 and having the second length. According to an embodiment, the slide plate 1260 may support the flexible display 1230, may be opened from the second lateral surface 1242 in a direction (e.g., the X-axial direction) of the fourth lateral surface 1244 to extend a display area of the flexible display 1230, or may be closed from the fourth lateral surface 1244 in a direction (e.g., the −X-axial direction) of the second lateral surface 1242 to reduce the display area of the flexible display 1230. According to an embodiment, the electronic device 1200 may include a first lateral cover 1240*a* and a second lateral cover 1240*b* to cover the first lateral surface 1241 and the third lateral surface 1243. According to an embodiment, the first lateral surface 1241 and the third lateral surface 1243 may be arranged not to be exposed to the outside by the first lateral cover 1240*a* and the second lateral cover 1240*b*. For example, the electronic device 1200 may include a rollable type electronic device of which a display area of the flexible display 1230 is changed according to movement of the slide plate 1260 from the housing 1240.

According to an embodiment, the slide plate 1260 may be coupled to be movable in a sliding manner so as to be at partially inserted into or withdrawn from the housing 1240. For example, the electronic device 1200 may be configured to have a first width w1 from the second lateral surface 1242 to the fourth lateral surface 1244 in a closed state. According to an embodiment, in an open state, the electronic device 1200 may be configured to have a second width w larger than the first width w1 and including a width w2 by which the hinge rail having been inserted into the housing 1240 moves to the outside of the electronic device 1200.

According to an embodiment, the slide plate 1260 may be operated by a user operation. In some embodiments, the slide plate 1260 may be automatically operated by a driving mechanism disposed in the internal space of the housing 1240. According to an embodiment, the electronic device 1200 may be configured to control an operation of the slide plate 1260 through the driving mechanism via a processor (e.g., the processor 120 in FIG. 1) in case that an event for open/close state shifting of the electronic device 1200 is detected. In some embodiments, a processor (e.g., the processor 120 in FIG. 1) of the electronic device 1200 may control to display an object in various manners and execute an application program in response to a display area of the flexible display 1230, which is changed according to an open state, a closed state, or an intermediate state of the slide plate 1260.

According to an embodiment, the electronic device 1200 may include at least one of an input device 1203, an audio output device 1206 or 1207, a sensor module 1204 or 1217, a camera module 1205 or 1216, a connector port 1208, a key input device (not shown) or an indicator (not shown). For another embodiment, the electronic device 1200 may omit at least one of the above-described components or additionally include other components.

According to an embodiment, the electronic device 1200 may include multiple antenna modules 1281, 1282, and/or 1283. According to an embodiment, the antenna 1281, 1282, and/or 1283 may include a legacy antenna, a mmWave antenna, a near field communication (NFC) antenna, a wireless charging antenna, and/or a magnetic secure transmission (MST) antenna.

According to an embodiment, the housing 1240 (e.g., the lateral frame) may be at least partially made of a conductive material (e.g., metal material). According to an embodiment, the housing 1240 may include at least the first lateral surface 1241 and/or the third lateral surface 1243 which may be made of a conductive material and may be involved in the driving of the slide plate 1260, and may be divided into multiple conductive parts electrically insulated by a non-conductive material. According to an embodiment, the multiple conductive parts may be electrically connected to a wireless communication circuit (e.g., the wireless communication circuit 192 in FIG. 1) disposed in the electronic device 1200 to be used as antennas operating in various frequency bands.

According to exemplary embodiments of the disclosure, the conductive material may be divided into multiple conductive parts by using a non-conductive material through a predetermined process (e.g., insert injection or double injection). For example, the conductive parts may be formed into conductive parts having various shapes and/or numbers by non-conductive parts formed to intersect at least partially through a non-conductive material, and thus operate as antenna modules 1281, 1282, and/or 1283 corresponding to various frequency bands.

According to an embodiment, each antenna module 1281, 1282, or 1283 may include an antenna array including multiple conductive patches. According to an embodiment, the multiple conductive patches may include feeders (e.g., the first feeder 511 and the second feeder 512 in FIG. 5B) of the first structure and at least one feeder (e.g., the third feeder 513 in FIG. 5B) of the second structure. For example, an effect caused by at least one conductive part on at least one of the antenna modules 1281, 1282, and/or 1283 may be changed based on a state (e.g., an open state, a closed state, or an intermediate state) of the electronic device 1200. Accordingly, the at least one antenna module may adaptively configure, based on a state (e.g., an open state, a closed state, or an intermediate state) of the electronic device 1200, the feeders of the first structure and the at least one feeder of the second structure as a feeder for transmitting and/or receiving a signal.

Figure 13:
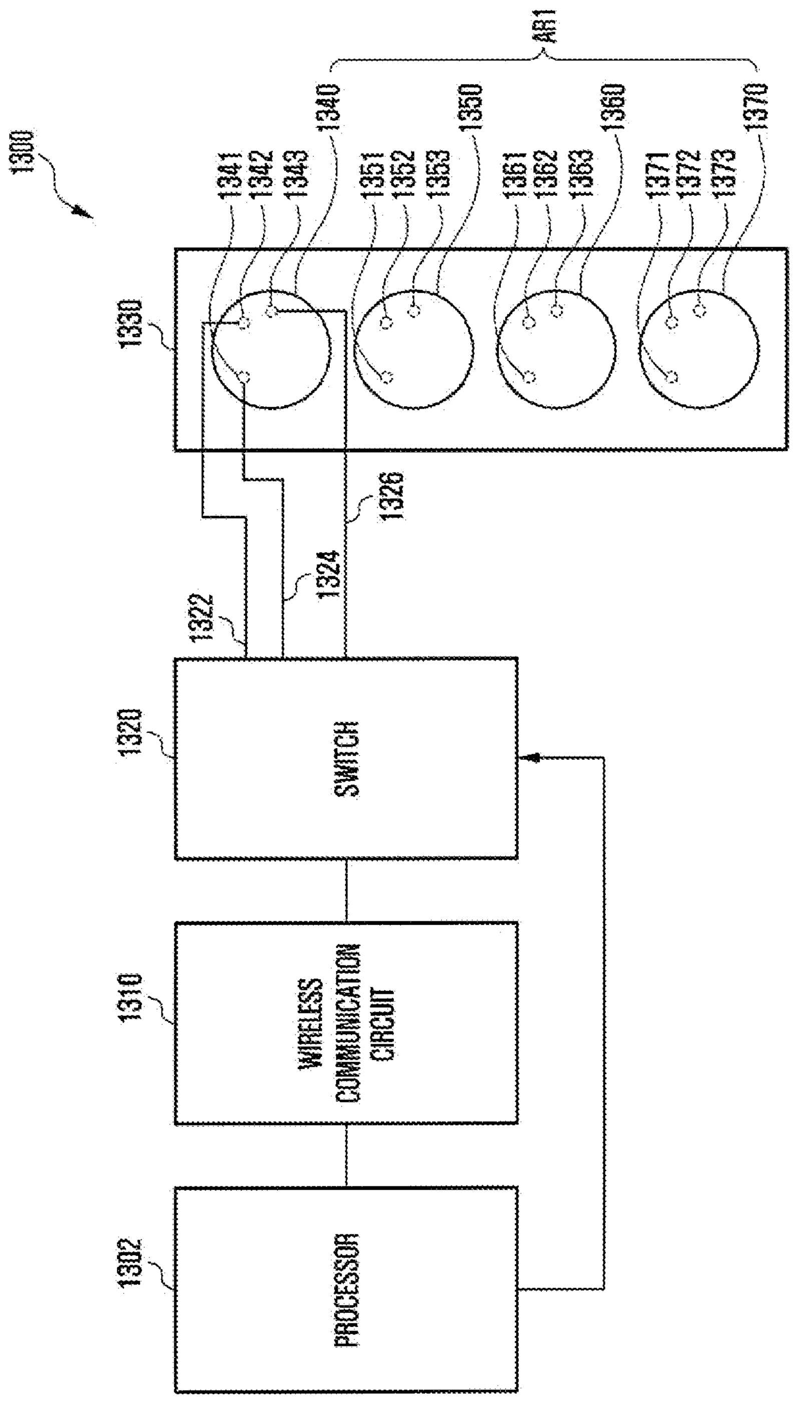
FIG. 13 is a block diagram of an electronic device for selecting a power feeding structure according to an embodiment of the disclosure.
Figure 14:
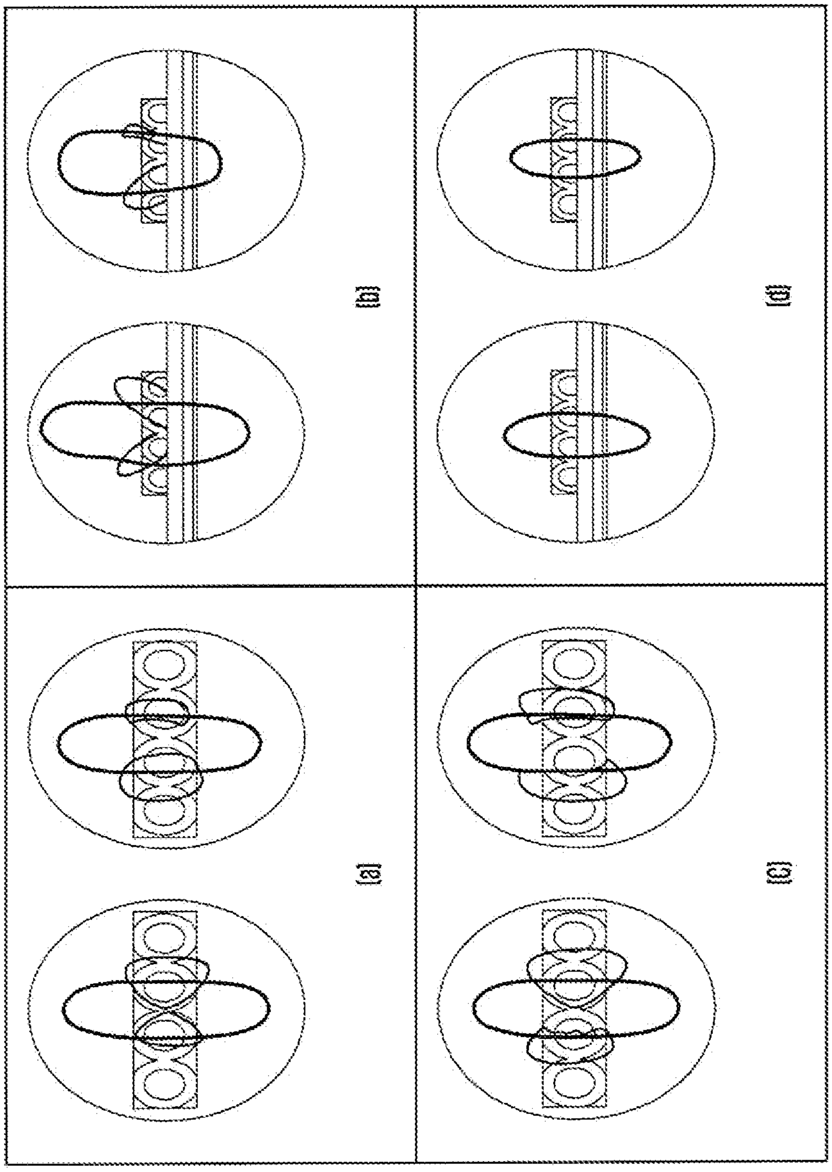
FIG. 14 is a radiation performance graph according to a power feeding structure according to certain embodiments of the disclosure.

FIG. 13 is a block diagram of an electronic device 1300 for selecting a power feeding structure according to an embodiment of the disclosure. According to an embodiment, the electronic device 1300 in FIG. 13 may be at least partially similar to the electronic device 101 in FIG. 1 or FIG. 2, the electronic device 300 in FIG. 3A, the electronic device 1100 in FIG. 11A, or the electronic device 1200 in FIG. 12A, or may additionally include other embodiments of an electronic device. For example, at least some components of FIG. 13 will be described with reference to FIG. 14. FIG. 14 is a radiation performance graph according to a power feeding structure according to certain embodiments of the disclosure.

Referring to FIG. 13, the electronic device 1300 may include a processor 1302, a wireless communication circuit 1310, a switch 1320 and/or an antenna module 1330. According to an embodiment, the processor 1302 may be substantially the same as the processor 120 (e.g., a communication processor) in FIG. 1 or included in the processor 120. The wireless communication circuit 1310 may be substantially the same as the wireless communication circuit 192 in FIG. 1 or included in the wireless communication circuit 192. According to an embodiment, the processor 1302 and the wireless communication circuit 1310 may be implemented in a single chip or a single package.

According to an embodiment, the processor 1302 may be operatively connected to the wireless communication circuit 1310, and/or the switch 1320. According to an embodiment, the processor 1302 may support radio communication using the wireless communication circuit 1310 and the antenna module 1330. For example, during reception, the processor 1302 may generate a baseband signal to be transmitted to an external device (e.g., the electronic device 104 or the server 108 in FIG. 1). The processor 1302 may convert a baseband signal into a medium-frequency band signal and transmit the medium-frequency band signal to the wireless communication circuit 1310. For example, the medium-frequency signal may include a first signal having a first polarization characteristic (e.g., horizontal polarization) and a second signal having a second polarization characteristic (e.g., vertical polarization). For example, during reception, the processor 1302 may convert a medium-frequency band signal received from the wireless communication circuit 1310 into a baseband signal and process same.

According to an embodiment, the wireless communication circuit 1310 may transmit/receive a signal to/from an external device through at least one network (e.g., 5G network). According to an embodiment, the wireless communication circuit 1310 may include a radio frequency integrated circuit (RFIC) and a radio frequency front end (RFFE). For example, the RFIC may convert a medium-frequency band signal (or a baseband signal) received from the processor 1302 (e.g., a communication processor) into a radio signal or convert a radio signal received from the RFFE into a medium-frequency band signal (or a baseband signal). For example, the RFFE may include processing for transmitting or receiving a signal through the antenna module 1330. For example, the RFFE may include an element for amplifying power of the signal or an element for removing noise.

According to an embodiment, the antenna module 1330 may include an antenna array AR1 including multiple conductive patches 1340, 1350, 1360, and/or 1370. According to an embodiment, the antenna module 1330 may operate as a dual polarized antenna through feeders arranged on each of the multiple conductive patches 1340, 1350, 1360, 1370. According to an embodiment, the first conductive patch 1340 may include a first feeder 1341 and a second feeder 1342 of the first structure, and a third feeder 1343 of the second structure. According to an embodiment, the second conductive patch 1350 may include a fourth feeder 1351 and a fifth feeder 1352 of the first structure, and a sixth feeder 1353 of the second structure. According to an embodiment, the third conductive patch 1360 may include a seventh feeder 1361 and an eighth feeder 1362 of the first structure, and a ninth feeder 1363 of the second structure. According to an embodiment, the fourth conductive patch 1370 may include a tenth feeder 1371 and a 11th feeder 1372 of the first structure, and a 12th feeder 1373 of the second structure. According to an embodiment, the wireless communication circuit 1310 may be configured to transmit and/or receive a first signal through a first polarized antenna array including the first feeder 1341, the fourth feeder 1351, the seventh feeder 1361, and/or the tenth feeder 1371. According to an embodiment, the wireless communication circuit 1310 may be configured to transmit and/or receive a second signal through a second polarized antenna array including the second feeder 1342, the fifth feeder 1352, the eighth feeder 1362, and/or the 11th feeder 1372. According to an embodiment, the wireless communication circuit 1310 may be configured to transmit and/or receive a third signal through the first polarized antenna array or the second polarized antenna array including the third feeder 1343, the sixth feeder 1353, the ninth feeder 1363, and/or the 12th feeder 1373.

According to an embodiment, the switch 1320 may configure a power feeding structure of the multiple conductive patches 1340, 1350, 1360, and/or 1370 included in the antenna module 1330, based on control of the processor 1302. According to an embodiment, the switch 1320 may be connected to the first feeder 1341 of the first conductive patch 1340 through a first electrical path 1322, connected to the second feeder 1342 through a second electrical path 1324, and connected to the third feeder 1343 through a third electrical path 1326. By way of example, the switch 1320 may include an absorptive switch capable of electrically isolating each of the electrical paths 1322, 1324, and/or 1346 of the feeders 1341, 1342, and/or 1343. For example, in case that the processor 1302 configures an operation of the first power feeding structure, the switch 1320 may connect the wireless communication circuit 1310 to the first feeder 1341 and the second feeder 1342. Here, the switch 1320 may block (or short-circuiting) electrical connection between the wireless communication circuit 1310 and the third feeder 1343 through the third electrical path 1326. For example, in case that the processor 1302 configures an operation of the second power feeding structure, the switch 1320 may connect the wireless communication circuit 1310 to the third feeder 1343. Here, the switch 1320 may block (or short-circuiting) electrical connection between the wireless communication circuit 1310, and the first feeder 1341 and the second feeder 1342 through the first electrical path 1322 and the second electrical path 1424. According to an embodiment, the switch 1320 may control the feeders 1351, 1352, 1353, 1361, 1362, 1363, 1371, 1372, and/or 1373 of the second conductive patch 1350, the third conductive patch 1360, and/or the fourth conductive patch 1370 included in the antenna module 1330 in the same manner as for the feeders 1341, 1342, and/or 1343 of the first conductive patch 1340.

According to an embodiment, the wireless communication circuit 1310 may include the switch 1320. For example, the wireless communication circuit 1310 may configure a power feeding structure of the multiple conductive patches 1340, 1350, 1360, and/or 1370 included in the antenna module 1330, based on control of the processor 1302.

According to an embodiment, the processor 1302 may adaptively configure the power feeding structure of the antenna module 1330. According to an embodiment, the processor 1302 may control the switch 1320 to adaptively configure a power feeding structure of the antenna module 1330, based on wireless environment information (e.g., whether multi-antenna system is supported or reception signal strength) of the electronic device 1300. For example, in case that the multiple conductive patches 1340, 1350, 1360, and/or 1370 included in the antenna module 1330 have the second power feeding structure or the first power feeding structure, radiation performances (e.g., equivalent isotropically radiated power (EIRP)) of signals having different polarization characteristics may be similar to each other, as shown in part (a) or part (c) in FIG. 14, in an environment not affected by an internal component (e.g., the conductive part) of the electronic device 1300. For example, in case that the multiple conductive patches 1340, 1350, 1360, and/or 1370 included in the antenna module 1330 have the first power feeding structure, radiation performances (e.g., EIRP) of signals having different polarization characteristics may be similar to each other, as shown in part (d) in FIG. 14, in an environment affected by an internal component (e.g., the conductive part) of the electronic device 1300. That is, in case of having the first power feeding structure in the state of being mounted in the electronic device 1300, the power feeding structures of the antenna module 1330 may be appropriately selected to improve the processing rate of a multi-antenna transmission method since radiation performances (e.g., EIRP) of signals having different polarization characteristics are similar to each other. For example, in case that the multiple conductive patches 1340, 1350, 1360, and/or 1370 included in the antenna module 1330 have the second power feeding structure, radiation performance (e.g., EIRP) of a signal having a first polarization characteristic (e.g., horizontal polarization) may be relatively better than that of a signal having a second polarization characteristic (e.g., vertical polarization), as shown in part (B) in FIG. 14, in an environment affected by an internal component (e.g., the conductive part) of the electronic device 1300. That is, in case of having the second power feeding structure in a state of being mounted in the electronic device 1300, the antenna module 1330 may be determined to be appropriate to widen a beam coverage since the antenna gain of the first signal of the first polarization characteristic is relatively higher. For example, in case that the electronic device 1300 supports multi-antenna communication for wireless communication with an external device, the processor 1302 may control the switch 1320 so that the antenna module 1330 has the first power feeding structure. For example, in case that the electronic device 1300 supports single antenna communication for wireless communication with an external device, the processor 1302 may control the switch 1320 so that the antenna module 1330 has the second power feeding structure.

According to an embodiment, the processor 1302 may control the switch 1320 to adaptively configure the power feeding structure of the antenna module 1330, based on a state (e.g., folded state, unfolded state, open state, or closed state) of the electronic device 1300. For example, in case that the electronic device 1300 is in the unfolded state (e.g., the unfolded state in FIG. 11A), the processor 1302 may control the switch 1320 so that the antenna module 1330 has the first power feeding structure (or the second power feeding structure). In case that the electronic device 1300 is in the folded state (e.g., the folded state in FIG. 11D), the processor 1302 may control the switch 1320 so that the antenna module 1330 has the second power feeding structure (or the first power feeding structure). For example, in case that the electronic device 1300 is in the closed state (e.g., the closed state in FIG. 12A), the processor 1302 may control the switch 1320 so that the antenna module 1330 has the first power feeding structure (or the second power feeding structure). In case that the electronic device 1300 is in the open state (e.g., the open state in FIG. 12B), the processor 1302 may control the switch 1320 so that the antenna module 1330 has the second power feeding structure (or the first power feeding structure).

According to an embodiment, an electronic device (e.g., the electronic device 101 in FIG. 1 or FIG. 2, the electronic device 300 in FIG. 3A, the electronic device 1100 in FIG. 11A, the electronic device 1200 in FIG. 12A, or the electronic device 1300 in FIG. 13) may include a housing (e.g., the housing 310 in FIG. 3A, the housing 1110, 1120 in FIG. 11A, or the housing 1240 in FIG. 12A), a wireless communication circuit (e.g., the third RFIC 226 in FIG. 2, the RFIC 452 in FIG. 4A, or the wireless communication circuit 595 in FIG. 5A) arranged in an internal space of the housing, an antenna module (e.g., the third antenna module 246 in FIG. 2 or FIG. 4A, or the antenna module 500 in FIG. 5A) arranged in the internal space and includes a printed circuit board (e.g., the printed circuit board 410 in FIG. 4A or the printed circuit board 590 in FIG. 5A) arranged in the internal space and array antenna (e.g., the array antenna in FIG. 4A or the array antenna in FIG. 5A) including multiple antenna elements arranged on the printed circuit board, wherein each one of the multiple antenna elements (e.g., 432, 434, 436, and 438 in FIG. 4A or 510, 520, 530, and 540 in FIG. 5A) includes a first feeder (e.g., 511 in FIG. 5A) arranged at a first point on a first virtual line passing through the center of the one of the multiple antenna elements, and is electrically connected to the wireless communication circuit through a first electrical path, a second feeder (e.g., 512 in FIG. 5A) arranged at a second point on a second virtual line passing through the center of the one of the multiple antenna elements and perpendicularly crossing the first virtual line, and is electrically connected to the wireless communication circuit through a second electrical path, and a third feeder (e.g., 513 in FIG. 5A) arranged at a third point on a third virtual line passing through the center of the one of the multiple antenna elements, and is electrically connected to the wireless communication circuit through a third electrical path, and a switch (e.g., the switch 1320 in FIG. 13) arranged on the first electrical path, the second electrical path, and the third electrical path, and is configured to electrically connect or disconnect the first feeder, the second feeder, and the third feeder to the wireless communication circuit.

According to an embodiment, the first virtual line may form a first angle with a virtual axis parallel with a first side of the printed circuit board and the second virtual line may intersect to the first virtual line at a perpendicular angle.

According to an embodiment, the third virtual line may be parallel with a first side of the printed circuit board.

According to an embodiment, the printed circuit board may include a first surface and a second surface opposite the first surface, the multiple antenna elements may be arranged on the first surface or on a location adjacent to the first surface inside the printed circuit board, and the wireless communication circuit may be arranged on the second surface.

According to an embodiment, the housing may include a front plate, a rear plate opposite the front plate, and a lateral member surrounding the internal space between the front plate and the rear plate, and the printed circuit board may be arranged to be perpendicular to the front plate in the internal space so that the multiple antenna elements face the lateral member.

According to an embodiment, when viewing the lateral member from the outside of the electronic device, the printed circuit board may be arranged to at least partially overlap a conductive part of the lateral member.

According to various embodiments, when viewing the lateral member from the outside of the electronic device, at least a portion of the multiple antenna elements may be arranged to overlap the conductive part.

According to an embodiment, the each one of the multiple antenna elements may have a vertically and horizontally symmetrical shape.

According to an embodiment, a processor operatively connected to the wireless communication circuit, the antenna module, and the switch may be further included, and the processor may control the switch to electrically connect the first feeder and the second feeder to the wireless communication circuit or electrically connect the third feeder to the wireless communication circuit.

According to an embodiment, the processor may control the switch to electrically connect the first feeder and the second feeder to the wireless communication circuit in case of multi-antenna communication, and may control the switch to electrically connect the third feeder to the wireless communication circuit in case of single antenna communication.

According to an embodiment, the switch may include an absorptive switch capable of electrically isolating the first electrical path, the second electrical path, and the third electrical path.

According to an embodiment, a display arranged in the internal space to be seen from the outside of the electronic device through a portion of the housing may be further included.

According to an embodiment, an electronic device may include a first housing, a second housing connected to the first housing to be spaced apart from the first housing at a first distance in a first state and spaced apart from the first housing at a second distance different from the first distance in a second state, a wireless communication circuit arranged in an internal space of the first housing, an antenna module arranged in the internal space and includes a printed circuit board arranged in the internal space, and array antenna including multiple antenna elements arranged on the printed circuit board, wherein each one of the multiple antenna elements includes a first feeder arranged at a first point on a first virtual line passing through the center of the one of the multiple antenna elements, and is electrically connected to the wireless communication circuit through a first electrical path, a second feeder arranged at a second point on a second virtual line passing through the center of the one of the multiple antenna elements and perpendicularly crossing the first virtual line, and is electrically connected to the wireless communication circuit through a second electrical path, and a third feeder arranged at a third point on a third virtual line passing through the center of the one of the multiple antenna elements, and is electrically connected to the wireless communication circuit through a third electrical path, and a switch arranged on the first electrical path, the second electrical path, and the third electrical path, and is configured to electrically connect or disconnect the first feeder, the second feeder, and the third feeder to the wireless communication circuit.

According to an embodiment, the second housing may be connected to the first housing through a hinge module to be at least partially foldable with respect thereto.

According to an embodiment, the second housing may be arranged to be slidable into the internal space of the first housing.

According to an embodiment, the first virtual line may form a first angle with a virtual axis parallel with a first side of the printed circuit board and the second virtual line may intersect the first virtual line at a perpendicular angle.

According to an embodiment, the third virtual line may be parallel with a first side of the printed circuit board.

According to an embodiment, the printed circuit board may include a first surface and a second surface opposite the first surface, the multiple antenna elements may be arranged on the first surface or on a location adjacent to the first surface inside the printed circuit board, and the wireless communication circuit may be arranged on the second surface.

According to an embodiment, the housing may include a front plate, a rear plate opposite the front plate, and a lateral member surrounding the internal space between the front plate and the rear plate, and the printed circuit board may be arranged to be perpendicular to the front plate in the internal space so that the multiple antenna elements face the lateral member.

According to an embodiment, a processor operatively connected to the wireless communication circuit, the antenna module, and the switch may be further included, and the processor may control the switch to electrically connect the first feeder and the second feeder to the wireless communication circuit or electrically connect the third feeder to the wireless communication circuit.

Figure 15:
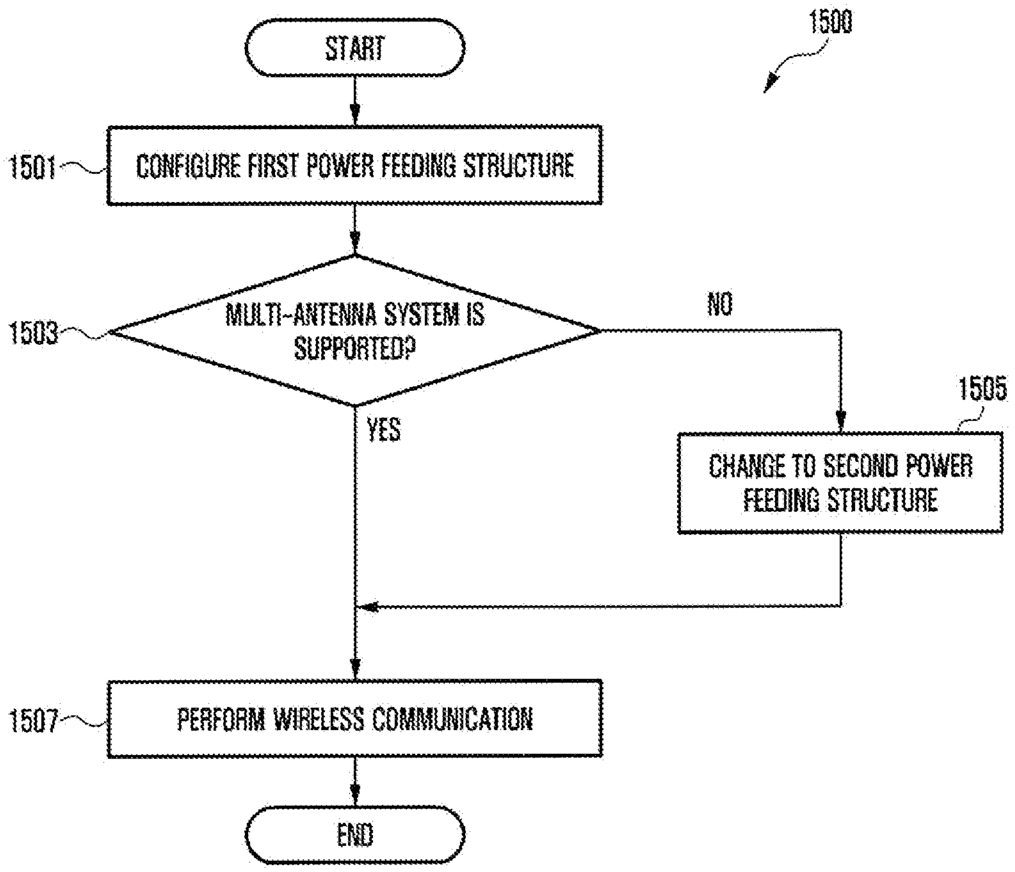
FIG. 15 is a flowchart for configuring a power feeding structure in an electronic device based on a wireless environment according to an embodiment of the disclosure.

FIG. 15 is a flowchart 1500 for configuring a power feeding structure in an electronic device based on a wireless environment according to an embodiment of the disclosure. In the following embodiment, the operations may be sequentially performed, but are not necessarily sequentially performed. For example, the sequential position of each operation may be changed, or two or more operations may be performed in parallel. For example, the electronic device in FIG. 15 may correspond to the electronic device 101 in FIG. 1 or FIG. 2, the electronic device 300 in FIG. 3A, the electronic device 1100 in FIG. 11A, the electronic device 1200 in FIG. 12A, or the electronic device 1300 in FIG. 13.

Referring to FIG. 15, according to an embodiment, in operation 1501, the electronic device (e.g., the processor 120 in FIG. 1 and/or the processor 1302 in FIG. 13) may configure an antenna module (e.g., the antenna module 1330 in FIG. 13) for wireless communication with an external device (e.g., the electronic device 104 or the server 108 in FIG. 1) with a first power feeding structure. According to an embodiment, the processor 1302 may configure a predetermined first power feeding structure of the electronic device 1300 as the power feeding structure of the multiple conductive patches 1340, 1350, 1360, and/or 1370 included in the antenna module 1330. For example, based on control of the processor 1302, the switch 1320 may electrically connect the first feeder 1341, the second feeder 1342, the fourth feeder 1351, the fifth feeder 1352, the seventh feeder 1361, the eighth feeder 1362, the tenth feeder 1371, and/or the 11th feeder 1372 of a conductive patch 1340, 1350, 1360, and/or 1370 to the wireless communication circuit 1310. Here, the switch 1320 may block (or short-circuiting) electrical connection between the wireless communication circuit 1310 and the third feeder 1343, the sixth feeder 1353, the ninth feeder 1363, and/or the 12th feeder 1373.

According to an embodiment, in operation 1503, the electronic device (e.g., the processor 120, 1302) may identify whether wireless communication with an external device (e.g., the electronic device 104 or the server 108 in FIG. 1) supports multi-antenna communication (multiple-input and multiple-output (MIMO) communication). According to an embodiment, the processor 1302 may identify whether communication with an external device supports multiple-input and multiple-output (MIMO) communication, based on control information received from an external device (e.g., gNB or eNB). By way of example, the control information may include an RRC connection setup message or an RRC connection reconfiguration message. According to an embodiment, in case that signal strength (a received signal strength indication (RSSI)) received from an external device satisfies a predetermined condition, the processor 1302 may determine that the wireless communication with the external electronic device supports multi-antenna communication.

According to an embodiment, in case that the wireless communication with an external device (e.g., the electronic device 104 or the server 108 in FIG. 1) supports multi-antenna communication (e.g., "Yes" in operation 1503), in operation 1507, the electronic device (e.g., the processor 120, 1302) may transmit and/or receive data to/from the external device through an antenna module (e.g., the antenna module 1330 in FIG. 13) configured as the first power feeding structure.

According to an embodiment, in case that the wireless communication with an external device (e.g., the electronic device 104 or the server 108 in FIG. 1) does not support multi-antenna communication (e.g., "No" in operation 1503), in operation 1505, the electronic device (e.g., the processor 120, 1302) may change the antenna module (e.g., the antenna module 1330 in FIG. 13) into the second power feeding structure for wireless communication with the external device (e.g., the electronic device 104 or the server 108 in FIG. 1). According to an embodiment, the processor 1302 may control the switch 1320 so that the multiple conductive patches 1340, 1350, 1360, and/or 1370 included in the antenna module 1330 are configured as the second power feeding structure. For example, based on control of the processor 1302, the switch 1320 may electrically connect the third feeder 1343, the sixth feeder 1353, the ninth feeder 1363, and/or the 12th feeder 1373 of the conductive patch 1340, 1350, 1360, and/or 1370 to the wireless communication circuit 1310. Here, the switch 1320 may block electrical connection between the wireless communication circuit 1310 and the first feeder 1341, the second feeder 1342, the fourth feeder 1351, the fifth feeder 1352, the seventh feeder 1361, the eighth feeder 1362, the tenth feeder 1371, and/or the 11th feeder 1372 of the conductive patch 1340, 1350, 1360, 1370.

According to an embodiment, in case that the antenna module (e.g., the antenna module 1330 in FIG. 13) is changed into the second power feeding structure (e.g., operation 1505), in operation 1507, the electronic device (e.g., the processor 120, 1302) may transmit and/or receive data to/from an external device through the antenna module (e.g., the antenna module 1330 in FIG. 13) configured as the second power feeding structure.

Figure 16:
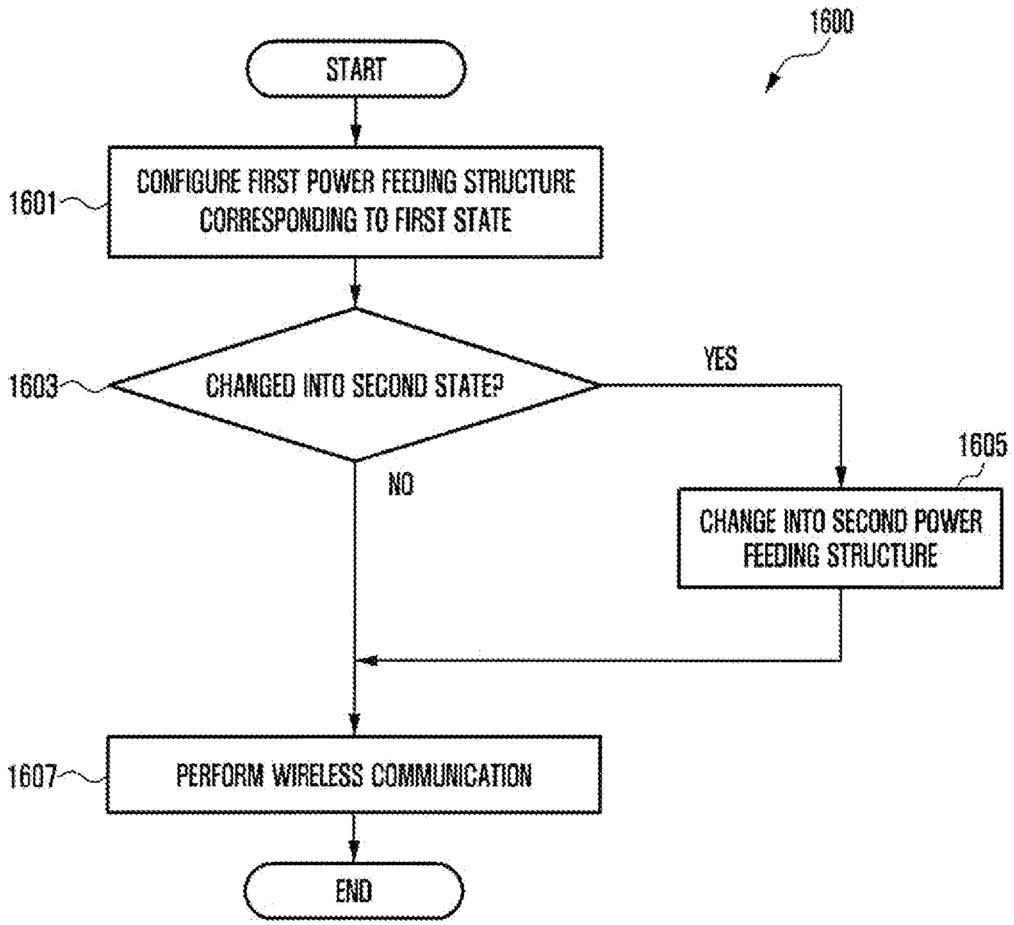
FIG. 16 is a flowchart for configuring a power feeding structure in an electronic device based on a state according to an embodiment of the disclosure.

FIG. 16 is a flowchart 1600 for configuring a power feeding structure in an electronic device based on a state according to an embodiment of the disclosure. In the following embodiment, the operations may be sequentially performed, but are not necessarily sequentially performed. For example, the sequential position of each operation may be changed, or two or more operations may be performed in parallel. For example, the electronic device in FIG. 16 may correspond to the electronic device 101 in FIG. 1 or FIG. 2, the electronic device 300 in FIG. 3A, the electronic device 1100 in FIG. 11A, the electronic device 1200 in FIG. 12A, or the electronic device 1300 in FIG. 13.

Referring to FIG. 16, according to an embodiment, in operation 1601, the electronic device (e.g., the processor 120 in FIG. 1 and/or the processor 1302 in FIG. 13) may configure an antenna module (e.g., the antenna module 1330 in FIG. 13) as the first power feeding structure (or the second power feeding structure) corresponding to a current state (e.g., the unfolded state or the closed state) of the electronic device for wireless communication with an external device (e.g., the electronic device 104 or the server 108 in FIG. 1). According to an embodiment, the processor 1302 may control the switch 1320 so that the multiple conductive patches 1340, 1350, 1360, and/or 1370 included in the antenna module 1330 are configured as the first power feeding structure.

According to an embodiment, in operation 1603, the electronic device (e.g., the processor 120, 1302) may identify whether a state of the electronic device is changed. According to an embodiment, the processor 1302 may identify whether the state of the electronic device 1100 in FIG. 11A is changed from the unfolded state to the folded state. By way of example, the state change of the electronic device 1100 in FIG. 11A may be identified based on sensor data acquired through a sensor module (e.g., the sensor module 176 in FIG. 1) included in the first housing 1110 and/or the second housing 1120. According to an embodiment, the processor 1302 may identify whether a state of the electronic device 1200 in FIG. 12A is changed from the closed state to the folded state. By way of example, the state change of the electronic device 1200 in FIG. 12A may be identified based on movement information of the slide plate 1260, which is acquired through a sensor module (e.g., the sensor module 176 in FIG. 1).

According to an embodiment, the processor 1302 may classify a case in which signal strength (e.g., received signal strength indication) received from an external device satisfies a predetermined condition as a first state, and a case in which signal intensity received from an external device does not satisfy a predetermined condition as a second state.

According to an embodiment, in case that the state of the electronic device (e.g., the processor 120, 1302) is maintained (e.g., "No" in operation 1603), in operation 1607, the electronic device may transmit and/or receive data to/from the external device through an antenna module (e.g., the antenna module 1330 in FIG. 13) configured as the first power feeding structure (or the second power feeding structure).

According to an embodiment, in case that the state of the electronic device (e.g., the processor 120, 1302) is changed (e.g., "Yes" in operation 1603), in operation 1605, the electronic device may change the antenna module (e.g., the antenna module 1330 in FIG. 13) into the second power feeding structure (or the first power feeding structure) for wireless communication with the external device (e.g., the electronic device 104 or the server 108 in FIG. 1). According to an embodiment, the processor 1302 may control the switch 1320 so that the multiple conductive patches 1340, 1350, 1360, and/or 1370 included in the antenna module 1330 are configured as the second power feeding structure.

According to an embodiment, in case that the antenna module (e.g., the antenna module 1330 in FIG. 13) is changed into the second power feeding structure (or the first power feeding structure) (e.g., operation 1605), in operation 1607, the electronic device (e.g., the processor 120, 1302) may transmit and/or receive data to/from the external device through the antenna module (e.g., the antenna module 1330 in FIG. 13) configured as the second power feeding structure (or the first power feeding structure).

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments disclosed in the specification and the drawings are merely presented as specific examples to easily explain the technical features according to the embodiments of the disclosure and help understanding of the embodiments of the disclosure and are not intended to limit the scope of the embodiments of the disclosure. Therefore, the scope of the various embodiments disclosed herein should be construed as encompassing all changes or modifications derived from the technical ideas of the various embodiments disclosed herein in addition to the embodiments disclosed herein.

What is claimed is:

1. An electronic device comprising:
- a housing;
- a wireless communication circuit arranged in an internal space of the housing;
- an antenna module arranged in the internal space and including:
  - a printed circuit board arranged in the internal space, and
  - an array antenna including multiple antenna elements arranged on the printed circuit board,
- wherein each one of the multiple antenna elements includes:
  - a first feeder arranged at a first point on a first virtual line passing through a center of the one of the multiple antenna elements, and is electrically connected to the wireless communication circuit through a first electrical path,
  - a second feeder arranged at a second point on a second virtual line passing through the center of the one of the multiple antenna elements and perpendicularly crossing the first virtual line, and is electrically connected to the wireless communication circuit through a second electrical path, and
  - a third feeder arranged at a third point on a third virtual line passing through the center of the one of the multiple antenna elements, and is electrically connected to the wireless communication circuit through a third electrical path;
- a switch arranged on the first electrical path, the second electrical path, and the third electrical path, and configured to electrically connect or disconnect the first feeder, the second feeder, and the third feeder to the wireless communication circuit; and
- a processor operatively connected to the wireless communication circuit, the antenna module, and the switch, wherein the processor is configured to:
- control the switch to electrically connect the first feeder and the second feeder to the wireless communication circuit when a communication method of the electronic device is changed to multi-antenna communication while the third feeder is electrically connected to the wireless communication circuit.

2. The electronic device of claim 1, wherein the first virtual line forms a first angle with a virtual axis parallel with a first side of the printed circuit board, and
- wherein the second virtual line intersects the first virtual line at a perpendicular angle.

3. The electronic device of claim 1, wherein the third virtual line is parallel with a first side of the printed circuit board.

4. The electronic device of claim 1, wherein the printed circuit board further comprises a first surface and a second surface opposite the first surface,
- wherein the multiple antenna elements are arranged on the first surface or on a location adjacent to the first surface inside the printed circuit board, and
- wherein the wireless communication circuit is arranged on the second surface.

5. The electronic device of claim 1, wherein the housing further comprises a front plate, a rear plate opposite the front plate, and a lateral member surrounding the internal space between the front plate and the rear plate, and
- wherein the printed circuit board is arranged to be perpendicular to the front plate in the internal space so that the multiple antenna elements face the lateral member.

6. The electronic device of claim 5, wherein, when viewing the lateral member from an outside of the electronic device, the printed circuit board is arranged to at least partially overlap a conductive part of the lateral member.

7. The electronic device of claim 6, wherein, when viewing the lateral member from the outside of the electronic device, at least a portion of the multiple antenna elements is arranged to overlap the conductive part.

8. The electronic device of claim 1, wherein the each one of the multiple antenna elements has a vertically and horizontally symmetrical shape.

9. The electronic device of claim 1, wherein the processor is further configured to:
- control the switch to electrically connect the third feeder to the wireless communication circuit in case of single antenna communication.

10. The electronic device of claim 1, wherein the switch further comprises an absorptive switch configured to electrically isolate the first electrical path, the second electrical path, and the third electrical path.

11. The electronic device of claim 1, further comprising a display arranged in the internal space to be seen from an outside of the electronic device through a portion of the housing.

12. The electronic device of claim 1, wherein the housing further comprises:
- a first housing; and
- a second housing connected to the first housing to be spaced apart from the first housing at a first distance in a first state and spaced apart from the first housing at a second distance different from the first distance in a second state, and wherein the wireless communication circuit and the antenna module are arranged in an internal space of the first housing.

13. The electronic device of claim 12, wherein the second housing is connected to the first housing via a hinge module to be at least partially foldable with respect thereto.

14. The electronic device of claim 12, wherein the second housing is arranged to be slidable into the internal space of the first housing.

15. The electronic device of claim 1, wherein the first feeder and the second feeder are arranged at a left side with respect to a first virtual axis parallel with a first side of the printed circuit board, and wherein the third feeder is arranged at a lower side with respect to a second virtual axis parallel with a second side of the printed circuit board.

16. The electronic device of claim 1, wherein for one of the multiple antenna elements, the first feeder and the second feeder are arranged at a left side with respect to a first virtual axis parallel with a first side of the printed circuit board, and the third feeder is arranged at a lower side with respect to a second virtual axis parallel with a second side of the printed circuit board, and wherein for another one of the multiple antenna elements, the third feeder is arranged at an upper side with respect to the second virtual axis.

17. The electronic device of claim 1, wherein for one of the multiple antenna elements, the first feeder and the second feeder are arranged at a left side with respect to a first virtual axis parallel with a first side of the printed circuit board, and the third feeder is arranged at a lower side with respect to a second virtual axis parallel with a second side of the printed circuit board, and wherein for another one of the multiple antenna elements, the first feeder and the second feeder are arranged at a right side with respect to the first virtual axis.

18. The electronic device of claim 1, wherein the first feeder, the second feeder, and the third feeder are arranged at a left side with respect to a first virtual axis parallel with a first side of the printed circuit board.

19. The electronic device of claim 1, wherein for one of the multiple antenna elements, the first feeder, the second feeder, and the third feeder are arranged at a left side with respect to a first virtual axis parallel with a first side of the printed circuit board, and wherein for another one of the multiple antenna elements, the first feeder and the second feeder are arranged at the left side with respect to the first virtual axis, and the third feeder is arranged at a right side with respect to the first virtual axis.

* * * * *